US010965568B2

(12) United States Patent
Zheng et al.

(10) Patent No.: US 10,965,568 B2
(45) Date of Patent: *Mar. 30, 2021

(54) BIT-FORWARDING INGRESS ROUTER, BIT-FORWARDING ROUTER, AND OPERATION, ADMINISTRATION AND MAINTENANCE TEST METHOD

(71) Applicant: Huawei Technologies Co., Ltd., Shenzhen (CN)

(72) Inventors: Lianshu Zheng, Beijing (CN); Guoyi Chen, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/411,936

(22) Filed: May 14, 2019

(65) Prior Publication Data

US 2019/0334798 A1 Oct. 31, 2019

Related U.S. Application Data

(63) Continuation of application No. 15/639,896, filed on Jun. 30, 2017, now Pat. No. 10,313,216, which is a
(Continued)

(30) Foreign Application Priority Data

Dec. 30, 2014 (CN) .......................... 201410850766.9

(51) Int. Cl.
*H04L 12/26* (2006.01)
*H04L 12/761* (2013.01)
(Continued)

(52) U.S. Cl.
CPC .......... *H04L 43/0811* (2013.01); *H04L 43/00* (2013.01); *H04L 45/16* (2013.01); *H04L 45/20* (2013.01); *H04L 45/50* (2013.01)

(58) Field of Classification Search
CPC ......... H04L 45/50; H04L 45/16; H04L 45/20; H04L 45/74; H04L 45/54; H04L 43/0811; H04L 12/18; H04L 12/1886
See application file for complete search history.

(56) References Cited

U.S. PATENT DOCUMENTS 10,313,216 B2 * 6/2019 Zheng .................... H04L 43/00
2009/0225660 A1 9/2009 Sakurai
(Continued)

FOREIGN PATENT DOCUMENTS

CN 101527727 A 9/2009
CN 101764722 A 6/2010
(Continued)

OTHER PUBLICATIONS

Wijnands et al., "Encapsulation for Bit Index Explicit Replication in MPLS Networks draff-wijnands-mpls-bier-encapsulation-02," Internet Engineering Task Force, Internet Draft, Intended Status: Standards Track, pp. 1-13, (Dec. 4, 2014).
(Continued)

*Primary Examiner* — Jamal Javaid
(74) *Attorney, Agent, or Firm* — Leydig, Voit & Mayer, Ltd.

(57) ABSTRACT

Embodiments of this application provide a bit-forwarding ingress router, a bit-forwarding router, and an OAM test method, and pertain to the field of multicast networks. A first BFR receives an OAM request packet from a BFIR; the first BFR determines, according to the OAM request packet, that a destination BFR corresponding to the OAM request packet is the first BFR; and the first BFR obtains a first OAM response packet according to an ID of the BFIR, and sends the first OAM response packet to the BFIR. According to the method and the apparatus that are provided in the embodiments of this application, a problem that a BFIR cannot diagnose or handle a transmission fault when the fault
(Continued)

occurs during transmission of a multicast packet can be resolved, which helps implement connectivity testing by using an OAM packet and enables testing of multiple BFERs.

21 Claims, 11 Drawing Sheets

Related U.S. Application Data continuation of application No. PCT/CN2015/098113, filed on Dec. 21, 2015.

(51) Int. Cl.
*H04L 12/733* (2013.01)
*H04L 12/723* (2013.01)

(56) References Cited

U.S. PATENT DOCUMENTS

| | | |
|---|---|---|
| 2013/0232258 A1 | 9/2013 | Bullock et al. |
| 2014/0314092 A1 | 10/2014 | Kishita |
| 2015/0063094 A1 | 3/2015 | Li et al. |
| 2016/0119159 A1* | 4/2016 | Zhao .............. H04L 12/1854 370/390 |
| 2016/0134535 A1 | 5/2016 | Callon |
| 2017/0126481 A1* | 5/2017 | Pignataro .......... H04L 69/324 |

FOREIGN PATENT DOCUMENTS

| | | |
|---|---|---|
| CN | 103428045 A | 12/2013 |
| CN | 103701625 A | 4/2014 |
| EP | 2099180 A1 | 9/2009 |
| EP | 2838227 A1 | 2/2015 |
| JP | 2009212875 A | 9/2009 |
| JP | 2013150342 A | 8/2013 |
| WO | 2011064884 A1 | 6/2011 |
| WO | 2013065210 A1 | 5/2013 |

OTHER PUBLICATIONS

Xu et al. "BIER Encapsulation; draft-xu-bier-encapsulation-01," Network Working Group, Internet-Draft, Intended Status: Standards Track, XP015102306, pp. 1-6, Internet Engineering Task Force, Geneva, Switzerland (Oct. 20, 2014).
Wijnands et al.,"Multicast using Bit Index Explicit Replication; draft-wijnands-bier-architecture-01," Internet Engineering Task Force, Internet-Draft, Intended status: Standards Track, XP015102219, pp. 1-24, Internet Engineering Task Force, Geneva, Switzerland (Oct. 16, 2014).
Aggarwal et al., "MPLS Upstream Label Assignment and Context-Specific Label Space," Network Working Group, RFC5331, pp. 1-13, The Internet Society, Reston, Virginia (Aug. 2008).
Rosen et al., "MPLS Label Stack Encoding," Network Working Group, RFC3032, pp. 1-23, The Internet Sociey, Reston, Virginia (Jan. 2001).

* cited by examiner

CONT.
FROM
FIG. 10A

CONT.
FROM
FIG. 10A

CONT.
FROM
FIG. 10A

1008. Receive the first OAM request packet

1009. Determine, according to the first OAM request packet, that a destination BFR corresponding to the first OAM request packet is the first BFER 1010. Obtain, according to the ID of the BFIR, the set identifier and the bit string that are corresponding to the BFIR 1011. Obtain a second OAM response packet according to the bit string corresponding to the BFIR 1012. Obtain a first OAM response packet by inserting a BIER-MPLS Label into the second OAM response packet according to the set identifier corresponding to the BFIR 1013. Add a TTL of the BIER-MPLS Label into the first OAM response packet

| Version information (4 bits) | Protocol type (4 bits) | Length (4 bits) | Entropy (20 bits) |
|---|---|---|---|
| Bit string (first 32 bits) ||||
| Bit string (middle part) ||||
| Bit string (last 32 bits) ||||
| Reserved area (16 bits) || Bit-forwarding ingress router identifier (16 bits) ||

FIG. 12

| Version number | Packet type | Reserved area | Reply mode | Reply code |
|---|---|---|---|---|
| Bit-forwarding router identifier |||||
| Previous-hop bit-forwarding router identifier |||||
| Sender identifier |||||
| Serial number |||||
| Sending timestamp |||||
| Receiving timestamp |||||
| Type length value |||||

FIG. 13

| Type (16 bits) | Length of a TLV (16 bits) |
|---|---|
| Set identifier (16 bits) | Length of a bit string (16 bits) |
| Bit string (first 32 bits) ||
| Bit string (middle part) ||
| Bit string (last 32 bits) ||

FIG. 14

BIT-FORWARDING INGRESS ROUTER, BIT-FORWARDING ROUTER, AND OPERATION, ADMINISTRATION AND MAINTENANCE TEST METHOD

CROSS-REFERENCE TO RELATED APPLICATIONS

This application is a continuation of U.S. patent Ser. No. 15/639,896, filed on Jun. 30, 2017, which is a continuation of International Application No. PCT/CN2015/098113, filed on Dec. 21, 2015. The International Application claims priority to Chinese Patent Application No. 201410850766.9, filed on Dec. 30, 2014. All of the aforementioned patent applications are hereby incorporated by reference in their entireties.

TECHNICAL FIELD

The present disclosure relates to the field of multicast networks, and in particular, to a bit-forwarding ingress router, a bit-forwarding router, and an operation, administration and maintenance (OAM) test method.

BACKGROUND

Bit indexed explicit replication (BIER) is a brand new multicast technology in which transmission of a multicast packet is implemented by using multiple bit-forwarding routers (BFR) provided in a BIER domain.

When a bit-forwarding ingress router (BFIR) in the BIER domain sends a multicast packet to at least one bit-forwarding egress router (BFER) in the BIER domain, the multicast packet is transmitted by encoding identification information corresponding to each BFER into the multicast packet and sending the multicast packet to a corresponding BFER according to the identification information. The BFIR uses a combination of a set identifier (SI) and a bit string as identification information of the at least one BFER.

In the prior art, when a transmission fault occurs during transmission of a multicast packet, a BFIR cannot diagnose or handle the fault.

SUMMARY

To resolve the problem in the background, embodiments of the present invention provide a bit-forwarding ingress router, a bit-forwarding router, and an OAM test method, to help the BFIR diagnose a fault that occurs during transmission of a multicast packet. Technical solutions provided in the embodiments of the present invention are as follows:

According to a first aspect, a BFIR is provided, where the BFIR is in a BIER network, and the router includes:

a first obtaining unit, configured to obtain a first OAM request packet according to an identifier (ID) of at least one BFER, where the first OAM request packet includes an ID of the BFIR, a set identifier, and a bit string corresponding to the at least one BFER, the set identifier is corresponding to the at least one BFER, and the first OAM request packet is used for testing a link between the BFIR and the at least one BFER; and a first sending unit, configured to send the first OAM request packet to the at least one BFER.

In a first possible implementation manner of the first aspect, the first OAM request packet further includes a type length value (TLV), and the TLV is used to carry the set identifier, the bit string, and a length of the bit string.

With reference to the first aspect or the first possible implementation manner of the first aspect, in a second possible implementation manner, the first obtaining unit is specifically configured to obtain the set identifier and the bit string according to the ID of the at least one BFER;

the first obtaining unit is specifically configured to obtain a second OAM request packet according to the bit string, where a packet header of the second OAM request packet includes the bit string and the ID of the BFIR, and a payload of the second OAM request packet includes an OAM packet; and the first obtaining unit is specifically configured to obtain the first OAM request packet by inserting a first bit indexed explicit replication multiprotocol label switching label (BIER-MPLS Label) into the second OAM request packet according to the set identifier, where the first BIER-MPLS Label includes a label corresponding to the set identifier.

With reference to the first aspect, or the first possible implementation manner of the first aspect, or the second possible implementation manner of the first aspect, in a third possible implementation manner of the first aspect, the first OAM request packet is used for testing a link between the BFIR and a first BFR, and the first BFR is a device on the link between the BFIR and the at least one BFER;

the first obtaining unit is further configured to determine a first time-to-live (TTL), where a value of the first TTL is M, and M is used to identify a hop count before the first OAM request packet arrives at the first BFR from the BFIR; and the first obtaining unit is further configured to add the first TTL into the first OAM request packet.

With reference to the third possible implementation manner of the first aspect, in a fourth possible implementation manner of the first aspect, the BFIR further includes:

a first receiving unit, configured to receive a first OAM response packet from the first BFR, where the first OAM response packet includes an ID of a third BFR, an ID of the first BFR, a set identifier corresponding to the BFIR, and a bit string corresponding to the BFIR, and the third BFR is a previous hop of the first BFR on the link between the BFIR and the at least one BFER;

a second obtaining unit, configured to obtain a second TTL according to the first OAM response packet and the first TTL, where a value of the second TTL is a result of adding a preset value to the value of the first TTL;

a third obtaining unit, configured to obtain a third OAM request packet by inserting a second BIER-MPLS Label into the second OAM request packet according to the second TTL and the set identifier, where the second BIER-MPLS Label includes the label corresponding to the set identifier and the second TTL, the third OAM request packet is used for testing a link between the BFIR and a second BFR, and the second BFR is a next hop of the first BFR on the link between the BFIR and the at least one BFER; and a second sending unit, configured to send the third OAM request packet to the first BFER.

With reference to the fourth possible implementation manner of the first aspect, in a fifth possible implementation manner of the first aspect, the second BFR is a BFER.

With reference to the first aspect, or the first, the second, the third, the fourth or the fifth possible implementation manner of the first aspect, in a sixth possible implementation manner, the at least one BFER includes the first BFER, and the BFIR further includes:

a second receiving unit, configured to receive an OAM response packet from the first BFER, where the OAM response packet includes an ID of the first BFER, the set identifier corresponding to the BFIR, and the bit string corresponding to the BFIR.

With reference to the first aspect, or the first, the second, the third, the fourth, the fifth or the sixth possible implementation manner of the first aspect, in a seventh possible implementation manner of the first aspect, the second OAM request packet includes a first bit and a second bit, the first bit is used to identify the second OAM request packet as an OAM packet, and the second bit is used to identify a type of the second OAM request packet as a request.

According to a second aspect, a first bit-forwarding router (BFR) is provided, where the first BFR is in a BIER-based network, and the router includes:

a receiving unit, configured to receive an OAM request packet from a BFIR, where the OAM request packet includes an identifier ID of the BFIR, a set identifier corresponding to at least one BFER, and a bit string corresponding to the at least one BFER, and the OAM request packet is used for testing a link between the BFIR and the at least one BFER;

a destination determining unit, configured to determine, according to the OAM request packet, that a destination BFR corresponding to the OAM request packet is the first BFR;

a first obtaining unit, configured to obtain a first OAM response packet according to the ID of the BFIR, where the first OAM response packet includes an ID of the first BFR and a set identifier and a bit string that are corresponding to the BFIR; and a first sending unit, configured to send the first OAM response packet to the BFIR.

In a first possible implementation manner of the second aspect, the first BFR is a BFER among the at least one BFER; and the destination determining unit is specifically configured to: determine, according to the set identifier and the bit string that are included in the OAM request packet, that the at least one BFER includes the first BFR; and determine that the destination BFR corresponding to the OAM request packet is the first BFR.

With reference to the first possible implementation manner of the second aspect, in a second possible implementation manner of the second aspect, the OAM request packet further includes a TLV, and the TLV is used to carry the set identifier, the bit string, and a length of the bit string; and the first BFR further includes:

a verification unit, configured to determine, according to the TLV included in the OAM request packet, that the at least one BFER includes the first BFR; where the verification unit is configured to verify that the destination BFR of the OAM request packet is the first BFR.

With reference to the second possible implementation manner of the second aspect, in a third possible implementation manner of the second aspect, the verification unit is further configured to obtain an ID of the at least one BFER according to the set identifier, the bit string, and the length of the bit string that are carried in the TLV;

the verification unit is further configured to check whether an ID of the first BFR is included in the ID of the at least one BFER; and if the ID of the first BFR is included in the ID of the at least one BFER, the verification unit is further configured to determine that the at least one BFER includes the first BFR.

In a fourth possible implementation manner of the second aspect, the first BFR is a BFR on the link between the BFIR and the at least one BFER, and a packet header of the OAM request packet includes a TTL; and the destination determining unit is configured to: decrease a value of the TTL by a preset value; and determine that the value of the TTL obtained after the preset value is deducted reaches 0, and determine that the destination BFR corresponding to the OAM request packet is the first BFR.

With reference to the fourth possible implementation manner of the second aspect, in a fifth possible implementation manner of the second aspect, the first BFR further includes a second sending unit;

the destination determining unit is further configured to: determine that the value of the TTL obtained after the preset value is deducted does not reach 0, and determine that the destination BFR corresponding to the OAM request packet is not the first BFR; and the second sending unit is configured to send the OAM request packet to the at least one BFER.

With reference to the second aspect, or the first, the second, the third, the fourth or the fifth possible implementation manner of the second aspect, in a sixth possible implementation manner of the second aspect, the first obtaining unit is specifically configured to obtain, according to the ID of the BFIR, the set identifier and the bit string that are corresponding to the BFIR;

the first obtaining unit is specifically configured to obtain a second OAM response packet according to the bit string corresponding to the BFIR, where a packet header of the second OAM response packet includes the bit string corresponding to the BFIR and the ID of the first BFR, and a payload of the second OAM response packet includes an OAM packet; and the first obtaining unit is specifically configured to obtain the first OAM response packet by inserting a BIER-MPLS Label into the second OAM response packet according to the set identifier corresponding to the BFIR, where the BIER-MPLS Label includes a label corresponding to the set identifier corresponding to the BFIR.

With reference to the sixth possible implementation manner of the second aspect, in a seventh possible implementation manner of the second aspect, the first obtaining unit is further configured to obtain an ID of a second BFR, where the second BFR is a previous hop of the first BFR on the link between the BFIR and the at least one BFER; and the first obtaining unit is further configured to add the ID of the second BFR into the payload of the second OAM response packet.

With reference to the second aspect, or the first, the second, the third, the fourth, the fifth, the sixth or the seventh possible implementation manner of the second aspect, in an eighth possible implementation manner of the second aspect, the OAM response packet includes a first bit and a second bit, the first bit is used to identify the OAM response packet as an OAM packet, and the second bit is used to identify a type of the OAM response packet as a response.

According to a third aspect, an OAM test method is provided, used in a bit indexed explicit replication BIER-based network, where the method includes:

obtaining, by a BFIR, a first OAM request packet according to an identifier ID of at least one BFER, where the first OAM request packet includes an ID of the BFIR, a set identifier, and a bit string corresponding to the at least one BFER, the set identifier is corresponding to the at least one BFER, and the first OAM request packet is used for testing a link between the BFIR and the at least one BFER; and sending, by the BFIR, the first OAM request packet to the at least one BFER.

In a first possible implementation manner of the third aspect, the first OAM request packet further includes a TLV, and the TLV is used to carry the set identifier, the bit string, and a length of the bit string.

With reference to the third aspect or the first possible implementation manner of the third aspect, in a second possible implementation manner of the third aspect, the obtaining, by a BFIR, a first OAM request packet according to an ID of at least one BFER includes:

obtaining, by the BFIR, the set identifier and the bit string according to the ID of the at least one BFER;

obtaining, by the BFIR, a second OAM request packet according to the bit string, where a packet header of the second OAM request packet includes the bit string and the ID of the BFIR, and a payload of the second OAM request packet includes an OAM packet; and obtaining, by the BFIR, the first OAM request packet by inserting a first BIER-MPLS Label into the second OAM request packet according to the set identifier, where the first BIER-MPLS Label includes a label corresponding to the set identifier.

With reference to the third aspect, or the first or the second possible implementation manner of the third aspect, in a third possible implementation manner of the third aspect, the first OAM request packet is used for testing a link between the BFIR and a first BFR, and the first BFR is a device on the link between the BFIR and the at least one BFER; and the obtaining, by a BFIR, a first OAM request packet according to an identifier ID of at least one BFER further includes:

determining, by the BFIR, a first TTL, where a value of the first TTL is M, and M is used to identify a hop count before the first OAM request packet arrives at the first BFR from the BFIR; and adding, by the BFIR, the first TTL into the first OAM request packet.

With reference to the third possible implementation manner of the third aspect, in a fourth possible implementation manner, the method further includes:

receiving, by the BFIR, a first OAM response packet from the first BFR, where the first OAM response packet includes an ID of a third BFR, an ID of the first BFR, a set identifier corresponding to the BFIR, and a bit string corresponding to the BFIR, and the third BFR is a previous hop of the first BFR on the link between the BFIR and the at least one BFER;

obtaining, by the BFIR, a second TTL according to the first OAM response packet and the first TTL, where a value of the second TTL is a result of adding a preset value to the value of the first TTL;

obtaining, by the BFIR, a third OAM request packet by inserting a second BIER-MPLS Label into the second OAM request packet according to the second TTL and the set identifier, where the second BIER-MPLS Label includes the second TTL and the label corresponding to the set identifier, the third OAM request packet is used for testing a link between the BFIR and a second BFR, and the second BFR is a next hop of the first BFR on the link between the BFIR and the at least one BFER; and sending, by the BFIR, the third OAM request packet to the second BFR.

With reference to the fourth possible implementation manner of the third aspect, in a fifth possible implementation manner of the third aspect, the second BFR is a BFER.

With reference to the third aspect, or the first or the second possible implementation manner of the third aspect, in a fifth possible implementation manner of the third aspect, the at least one BFER includes a first BFER, and the method further includes:

receiving, by the BFIR, an OAM response packet from the first BFER, where the OAM response packet includes an ID of the first BFER, the set identifier corresponding to the BFIR, and the bit string corresponding to the BFIR.

With reference to the fifth possible implementation manner of the third aspect, in a sixth possible implementation manner, the second OAM request packet includes a first bit and a second bit, the first bit is used to identify the second OAM request packet as an OAM packet, and the second bit is used to identify a type of the second OAM request packet as a request.

According to a fourth aspect, an OAM test method is provided, where the method is used in a bit indexed explicit replication BIER-based network and includes:

receiving, by a first BFR, an OAM request packet from a BFIR, where the OAM request packet includes an identifier ID of the BFIR, a set identifier, and a bit string corresponding to the at least one BFER, the set identifier is corresponding to at least one BFER, and the OAM request packet is used for testing a link between the BFIR and the at least one BFER;

determining, by the first BFR according to the OAM request packet, that a destination BFR corresponding to the OAM request packet is the first BFR;

obtaining, by the first BFR, a first OAM response packet according to the ID of the BFIR, where the OAM response packet includes an ID of the first BFR, a set identifier corresponding to the BFIR, and a bit string corresponding to the BFIR; and sending, by the first BFR, the first OAM response packet to the BFIR.

In a first possible implementation manner of the fourth aspect, the first BFR is a BFER among the at least one BFER, and the determining, by the first BFR according to the OAM request packet, that a destination BFR corresponding to the OAM request packet is the first BFR includes:

determining, by the first BFR according to the set identifier and the bit string that are included in the OAM request packet, that the at least one BFER includes the first BFR; and determining, by the first BFR, that the destination BFR corresponding to the OAM request packet is the first BFR.

With reference to the first possible implementation manner of the fourth aspect, in a second possible implementation manner of the fourth aspect, the OAM request packet further includes a TLV, and the TLV is used to carry the set identifier, the bit string, and a length of the bit string; and before the obtaining, by the first BFR, a first OAM response packet according to the ID of the BFIR, the method further includes:

determining, by the first BFR according to the TLV included in the OAM request packet, that the at least one BFER includes the first BFR; and verifying, by the first BFR, that the destination BFR of the OAM request packet is the first BFR.

With reference to the second possible implementation manner of the fourth aspect, in a third possible implementation manner of the fourth aspect, the determining, by the first BFR according to the TLV included in the OAM request packet, that the at least one BFER includes the first BFR includes:

obtaining, by the first BFR, an ID of the at least one BFER according to the set identifier, the bit string, and the length of the bit string that are carried in the TLV;

checking, by the first BFR, whether an ID of the first BFR is included in the ID of the at least one BFER; and if the ID of the first BFR is included in the ID of the at least one BFER, determining, by the first BFR, that the at least one BFER includes the first BFR.

With reference to the fourth aspect, in a fourth possible implementation manner of the fourth aspect, the first BFR is a BFR on the link between the BFIR and the at least one BFER, and a packet header of the OAM request packet includes a TTL; and the determining, by the first BFR according to the OAM request packet, that a destination BFR corresponding to the OAM request packet is the first BFR includes:

decreasing, by the first BFR, a value of the TTL by a preset value; and determining, by the first BFR, that the value of the TTL obtained after the preset value is deducted reaches 0, and determining that the destination BFR corresponding to the OAM request packet is the first BFR.

With reference to the fourth possible implementation manner of the fourth aspect, in a fifth possible implementation manner, the method further includes:

determining, by the first BFR, that the value of the TTL obtained after the preset value is deducted does not reach 0, and determining that the destination BFR corresponding to the OAM request packet is not the first BFR; and sending, by the first BFR, the OAM request packet to the at least one BFER.

With reference to the fourth aspect, or the first, the second, the third, the fourth or the fifth possible implementation manner of the fourth aspect, in a sixth possible implementation manner of the fourth aspect, the obtaining, by the first BFR, a first OAM response packet according to the ID of the BFIR further includes:

obtaining, by the first BFR according to the ID of the BFIR, the set identifier corresponding to the BFIR and the bit string corresponding to the BFIR;

obtaining, by the first BFR, a second OAM response packet according to the bit string corresponding to the BFIR, where a packet header of the second OAM response packet includes the bit string corresponding to the BFIR and the ID of the first BFR, and a payload of the second OAM response packet includes an OAM packet; and obtaining, by the first BFR, the first OAM response packet by inserting a BIER-MPLS Label into the second OAM response packet according to the set identifier corresponding to the BFIR, where the BIER-MPLS Label includes a label corresponding to the set identifier corresponding to the BFIR.

With reference to the sixth possible implementation manner of the fourth aspect, in a seventh possible implementation manner, the obtaining, by the first BFR, a first OAM response packet according to the ID of the BFIR further includes:

obtaining, by the first BFR, an ID of a second BFR, where the second BFR is a previous hop of the first BFR on the link between the BFIR and the at least one BFER; and adding, by the first BFR, the ID of the second BFR into the payload of the second OAM response packet.

With reference to the fourth aspect, or the first, the second, the third, the fourth, the fifth, the sixth or the seventh possible implementation manner of the fourth aspect, in an eighth possible implementation manner of the fourth aspect, the OAM response packet includes a first bit and a second bit, the first bit is used to identify the OAM response packet as an OAM packet, and the second bit is used to identify a type of the OAM response packet as a response.

According to the method and the apparatus that are provided in the embodiments of the present invention, a BFIR may send an OAM request packet to one or more BFERs in a BIER network, and the OAM request packet includes one or more bit strings and set identifiers that are corresponding to the one or more BFERs; and a BFR in the BIER network may forward the OAM request packet to a corresponding to BFER according to the bit strings and the set identifiers. This helps resolve a problem that the BFIR cannot diagnose or handle a transmission fault when the fault occurs during transmission of a multicast packet. The BFIR may perform connectivity testing and/or fault locating on the one or more BFERs by using the OAM request packet, which helps reduce resource consumption and improve testing efficiency.

BRIEF DESCRIPTION OF DRAWINGS

FIG. 10A to FIG. 10C show a method flowchart of an OAM test method according to still another embodiment of the present invention;

FIG. 12 is a schematic diagram of an OAM packet header according to an embodiment of the present invention;

FIG. 13 is a schematic diagram of a payload area of an OAM packet according to an embodiment of the present invention; and FIG. 14 is a schematic diagram of a TLV according to an embodiment of the present invention.

DESCRIPTION OF EMBODIMENTS

In order to enable a person skilled in the art to better understand the solutions in the embodiments of the present invention, the following describes the embodiments of the present invention in more detail with reference to the accompanying drawings and implementation manners.

Figure 1:
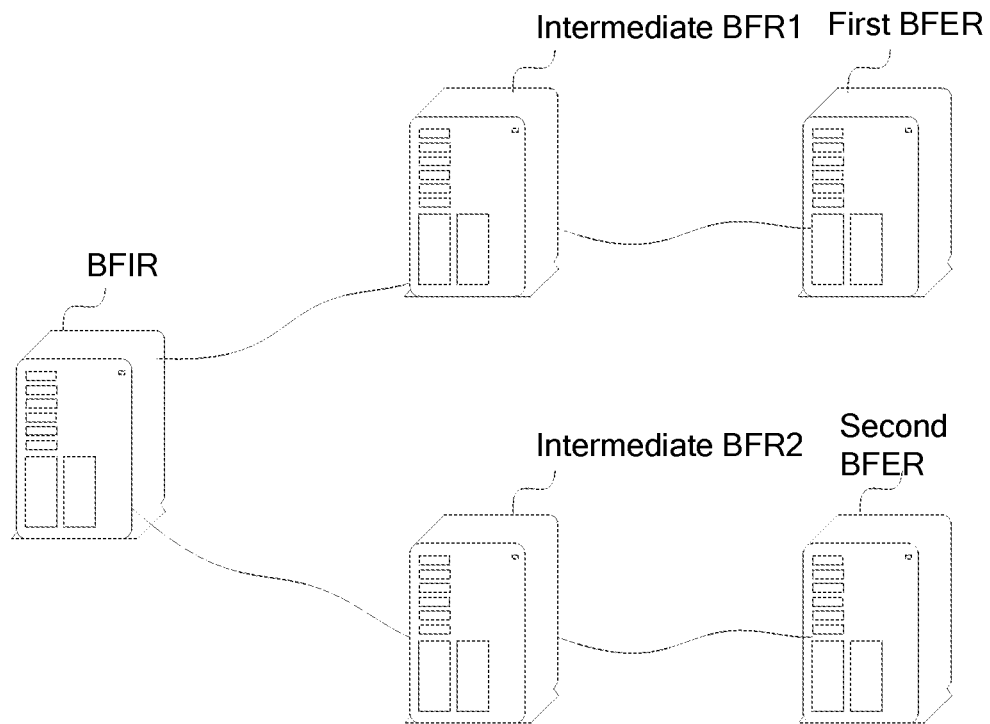
FIG. 1 is a schematic diagram of a BIER network according to an embodiment of the present invention.

A BIER network may include multiple BFRs. The multiple bit-forwarding routers may be classified into a BFIR, an intermediate BFR, and a BFER according to locations of the BFRs on a transmission link of a multicast packet. As shown in FIG. 1, the BIER network provided in the embodiments of the present invention includes: a BFIR, an intermediate BFR1, a first BFER, an intermediate BFR2, and a second BFER. The BFIR may be connected to the intermediate BFR1, and the intermediate BFR1 may be connected to the first BFER; the intermediate BFR1 may be a BFR on a link between the BFIR and the first BFER. The BFIR may be connected to the intermediate BFR2, and the intermediate BFR2 may be connected to the second BFER; the intermediate BFR2 may be a BFR on a link between the BFIR and the second BFER.

Each BFR in the BIER network has an ID. An ID of a BFR may be information that is used to identify an identity of the BFR in the BIER network and that is allocated to the BFR. There may be a correspondence between the ID of the BFR and an Internet Protocol (IP) address of the BFR. The ID of the BFR may be used to obtain, by means of calculation, a set identifier corresponding to the BFR and a bit string corresponding to the BFR, that is, the ID of the BFR may be corresponding to the set identifier and the bit string. For example, the set identifier corresponding to the BFR and the bit string corresponding to the BFR may be obtained according to the ID of the BFR, and the ID of the BFR may be obtained according to the set identifier corresponding to the BFR and the bit string corresponding to the BFR.

The set identifier corresponding to the BFR may be a value determined according to the ID of the BFR and a multiple of a preset value, where the preset value may be 256. The bit string corresponding to the BFR includes 256 bits, and a bit that is in the bit string corresponding to the BFR and that is corresponding to the BFR is set to 1. The bit may be used to indicate the BFR.

For example, if the ID of the BFR is 2, because 0<2<255, the set identifier corresponding to the BFR may be set to 0, and a second bit in the bit string corresponding to the BFR may be set to 1. The second bit may be a bit that is 1 bit lower than the most significant bit (MSB) of the bit string corresponding to the BFR, that is, the second bit may be a bit second to the MSB in a direction from the MSB to the least significant bit (LSB). Alternatively, the second bit may be a bit that is 1 bit higher than the LSB of the bit string corresponding to the BFR, that is, the second bit may be a bit second to the LSB in a direction from the LSB to the MSB. The second bit may accord with a definition of a bit in a bit string in the BIER network. A combination of the set identifier corresponding to the BFR and the bit string corresponding to the BFR may be used to identify the BFR in the BIER network.

For example, if the ID of the BFR is 258, because 255<258<511, the set identifier corresponding to the BFR may be 1, and a third bit in the bit string corresponding to the BFR may be set to 1. The third bit may be a bit that is 2 bits lower than the MSB of the bit string corresponding to the BFR, that is, the third bit may be a bit third to the MSB in a direction from the MSB to the LSB. Alternatively, the third bit may be a bit that is 2 bits higher than the LSB of the bit string corresponding to the BFR, that is, the third bit may be a bit third to the LSB in a direction from the LSB to the MSB. The third bit may accord with a definition of a bit in a bit string in the BIER network.

For example, if multiple BFRs are corresponding to a same set identifier, and multiple bits included in a bit string are set to 1, the bit string may be corresponding to the multiple BFRs, and the multiple bits are corresponding to the multiple BFRs in a one-to-one manner.

For ease of the following description, it is assumed that set identifiers corresponding to both the first BFER and the second BFER are 0; a second bit of a bit string corresponding to the first BFER is set to 1; a third bit in a bit string corresponding to the second BFER is set to 1, and the bit string corresponding to the first BFER and the bit string corresponding to the second BFER are a same bit string.

In FIG. 1, that there are only two intermediate BFRs and two BFERs is used as an example for description. However, no specific limitation is imposed on a quantity of routers in an actual network.

Figure 2:
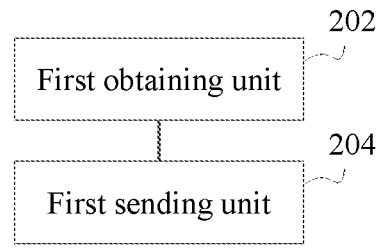
FIG. 2 is a structural block diagram of a BFIR according to an embodiment of the present invention.

Referring to FIG. 2, FIG. 2 shows a structural block diagram of a BFIR according to an embodiment of the present invention. The BFIR may be the BFIR shown in FIG. 1, and the BFIR may be further referred to as an OAM test apparatus. The BFIR includes a first obtaining unit 202 and a first sending unit 204.

The first obtaining unit 202 is configured to obtain a first OAM request packet according to an ID of at least one BFER, where the first OAM request packet includes an ID of the BFIR, a set identifier, and a bit string corresponding to the at least one BFER, the set identifier is corresponding to the at least one BFER, and the first OAM request packet is used for testing a link between the BFIR and the at least one BFER.

FIG. 1 is used as an example. If the BFIR needs to send the first OAM request packet to the first BFER and the second BFER, the set identifier in the first OAM request packet is a set identifier corresponding to the first BFER, that is, a set identifier corresponding to the second BFER, and the set identifier in the first OAM request packet is 0. A second bit and a third bit that are included in the bit string in the first OAM request packet are set to 1.

The first sending unit 204 is configured to send the first OAM request packet to the at least one BFER.

FIG. 1 is used as an example. If the BFIR sends the first OAM request packet to the first BFER and the second BFER, after receiving the first OAM request packet, the intermediate BFR1 may send the first OAM request packet to the first BFER according to the set identifier and the bit string in the first OAM request packet. After receiving the first OAM request packet, the intermediate BFR2 may send the first OAM request packet to the second BFER according to the set identifier and the bit string in the first OAM request packet.

In conclusion, according to the BFIR provided in this embodiment, a first OAM request packet is obtained according to an ID of at least one BFER, and the first OAM request packet is sent to the at least one BFER. This resolves a problem that the BFIR cannot diagnose or handle a transmission fault when the fault occurs during transmission of a multicast packet, thereby implementing connectivity testing between the BFIR and the BFER, and enabling multiple BFERs to be tested at the same time.

Figure 3:
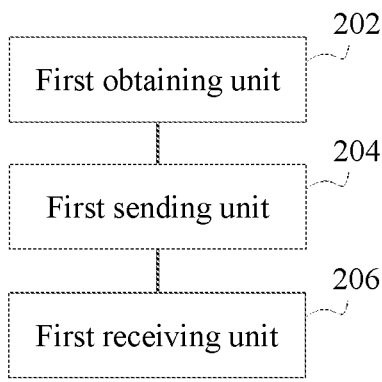
FIG. 3 is a structural block diagram of a BFIR according to another embodiment of the present invention.

Referring to FIG. 3, FIG. 3 shows a structural block diagram of a BFIR according to an embodiment of the present invention. The BFIR is in a BIER network. The BFIR may be the BFIR shown in FIG. 1, and the BFIR may further be a packet sending apparatus. The BFIR includes: a first obtaining unit 202, a first sending unit 204, and a first receiving unit 206.

The first obtaining unit 202 is configured to obtain a first OAM request packet according to an ID of at least one BFER, where the first OAM request packet includes an ID of the BFIR, a set identifier, and a bit string corresponding to the at least one BFER, the set identifier is corresponding to the at least one BFER, and the first OAM request packet is used for testing a link between the BFIR and the at least one BFER.

The first sending unit 204 is configured to send the first OAM request packet to the at least one BFER.

Optionally, the first OAM request packet further includes a TLV, and the TLV is used to carry the set identifier, the bit string, and a length of the bit string.

Optionally, the first obtaining unit 202 is specifically configured to obtain the set identifier and the bit string according to the ID of the at least one BFER;

the first obtaining unit 202 is specifically configured to obtain a second OAM request packet according to the bit string, where a packet header of the second OAM request packet includes the bit string and the ID of the BFIR, and a payload of the second OAM request packet includes an OAM packet; and the first obtaining unit 202 is specifically configured to obtain the first OAM request packet by inserting a first BIER-MPLS Label into the second OAM request packet according to the set identifier, where the first BIER-MPLS Label includes a label corresponding to the set identifier.

Optionally, the first OAM request packet is used for connectivity testing on a link between the BFIR and a first BFER; and the first obtaining unit 202 is further configured to add a preset time-to-live (TTL) into the first BIER-MPLS Label, where a value of the TTL is greater than a product of N and a preset value, N is a quantity of bit-forwarding routers BFR of the first OAM request packet, the BFR is a device on the link between the BFIR and the at least one BFER, and the value of the TTL may be 255.

Optionally, the first OAM request packet is used for connectivity testing on a link between the BFIR and a first BFR, and the first BFR is a device on the link between the BFIR and the first BFER; and the first obtaining unit 202 is further configured to: determine a first TTL, where a value of the first TTL is M, and M is used to identify a hop count before the first OAM request packet arrives at the first BFR from the BFIR; and add the first TTL into the first OAM request packet.

Optionally, the first receiving unit 206 is configured to receive a first OAM response packet from the first BFR, where the first OAM response packet includes an ID of a third BFR, a set identifier corresponding to the BFIR, and a bit string corresponding to the BFIR, and the third BFR is a previous hop of the first BFR on the link between the BFIR and the at least one BFER;

a second obtaining unit is further configured to obtain a second TTL according to the first OAM response packet and the first TTL, where a value of the second TTL is a result of adding a preset value to the value of the first TTL; and a third obtaining unit is further configured to obtain a third OAM request packet by inserting a second BIER-MPLS Label into the second OAM request packet according to the second TTL and the set identifier, where the second BIER-MPLS Label includes the label corresponding to the set identifier and the second TTL, the third OAM request packet is used for testing a link between the BFIR and a second BFR, and the second BFR is a next hop of the first BFR on the link between the BFIR and the at least one BFER.

The second obtaining unit, the third obtaining unit, and the first obtaining unit 202 may be a same unit, or may be different units. In FIG. 3, that the three units are a same unit, that is, the first obtaining unit 202, is used as an example for description.

A second sending unit is further configured to send the third OAM request packet to the first BFER.

The second sending unit and the first sending unit 204 may be a same unit, or may be different units. In FIG. 3, that the two units are a same unit, that is, the first sending unit 204, is used as an example for description.

Further, the second BFR is a BFER.

Optionally, the at least one BFER includes the first BFER; and the BFIR further includes:

a second receiving unit, configured to receive an OAM response packet from the first BFER, where the OAM response packet includes an ID of the first BFER, the set identifier corresponding to the BFIR, and the bit string corresponding to the BFIR.

The second receiving unit and the first receiving unit 206 may be a same unit, or may be different units. In FIG. 3, that the two units are a same unit, that is, the first receiving unit 206, is used as an example for description.

Optionally, the second OAM request packet includes a first bit and a second bit, the first bit is used to identify the second OAM request packet as an OAM packet, and the second bit is used to identify a type of the second OAM request packet as a request.

In conclusion, according to the BFIR provided in this embodiment, a first OAM request packet is obtained according to an ID of at least one BFER, and the first OAM request packet is sent to the at least one BFER. This resolves a problem that the BFIR cannot diagnose or handle a transmission fault when the fault occurs during transmission of a multicast packet, so that the BFIR can test connectivity to the BFER by using an OAM packet and can diagnose multiple BFERs at the same time.

In this embodiment, a first bit in a packet header of a packet is further set, and when receiving the packet, a BFR can identify the packet as an OAM packet by using the first bit, so that the BFR quickly distinguishes between the OAM packet and a BIER multicast packet, thereby improving forwarding efficiency of the BFR.

In this embodiment, after receiving the OAM request packet, the BFR further generates an OAM response packet according to the OAM request packet, and adds information such as a timestamp, a reply code, and a serial number into the OAM response packet, so that when receiving the OAM response packet, the BFIR can learn a situation such as a network delay according to information in the OAM response packet, thereby increasing usage scenarios of the OAM packet.

Figure 4:
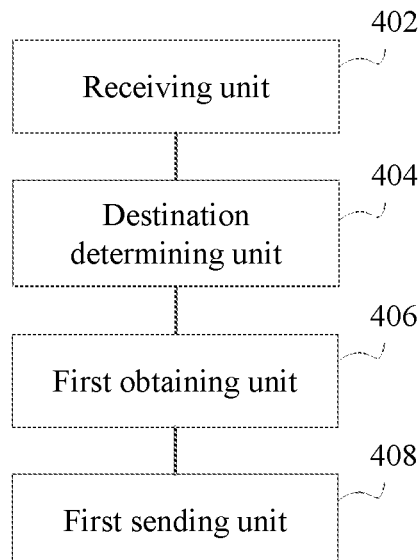
FIG. 4 is a structural block diagram of a BFR according to an embodiment of the present invention.

Referring to FIG. 4, FIG. 4 shows a structural block diagram of a first BFR according to an embodiment of the present invention. The first BFR is used in a BIER network. The first BFR may be the intermediate BFR1, the intermediate BFR2, the first BFER, or the second BFER shown in FIG. 1. The first BFR may be further referred to as an OAM test apparatus. The first BFR includes:

a receiving unit 402, configured to receive an operation, administration and maintenance OAM request packet from a bit-forwarding ingress router BFIR, where the OAM request packet includes an identifier ID of the BFIR, a set identifier corresponding to at least one bit-forwarding egress router BFER, and a bit string corresponding to the at least one BFER, and the OAM request packet is used for testing a link between the BFIR and the at least one BFER;

a destination determining unit 404, configured to determine, according to the OAM request packet, that a destination BFR corresponding to the OAM request packet is the first BFR;

a first obtaining unit 406, configured to obtain a first OAM response packet according to the ID of the BFIR, where the first OAM response packet includes an ID of the first BFR and a set identifier and a bit string that are corresponding to the BFIR; and a first sending unit 408, configured to send the first OAM response packet to the BFIR.

In conclusion, according to the first BFR provided in this embodiment, an OAM request packet from a BFIR is received by using the first BFR; it is determined, according to the OAM request packet, that a destination BFR corresponding to the OAM request packet is the first BFR; and an OAM response packet is obtained according to an ID of the BFIR; and the OAM response packet is sent to the BFIR. This resolves a problem that the BFIR cannot diagnose or handle a transmission fault when the fault occurs during transmission of a multicast packet, so that the BFIR can test connectivity to a BFER by using an OAM packet and can diagnose multiple BFERs at the same time.

Figure 5:
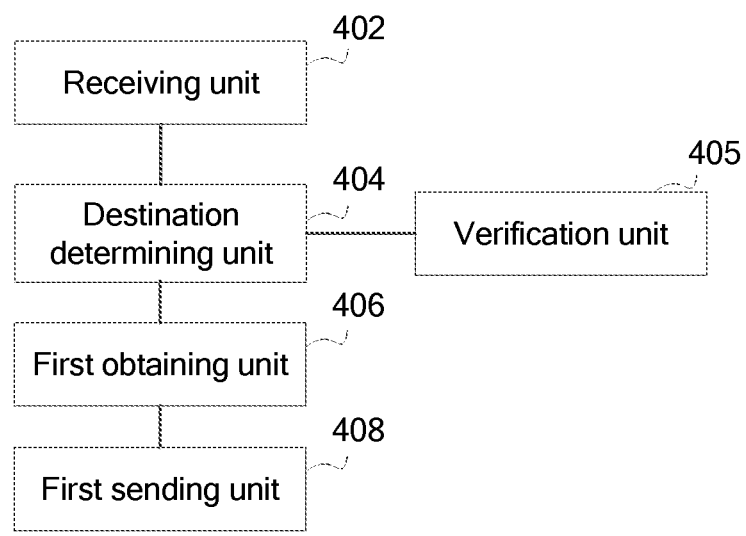
FIG. 5 is a structural block diagram of a BFR according to another embodiment of the present invention.

Referring to FIG. 5, FIG. 5 shows a structural block diagram of a first BFR according to an embodiment of the present invention. The first BFR is used in a BIER network. The first BFR may be the intermediate BFR1, the intermediate BFR2, the first BFER, or the second BFER shown in FIG. 1. The first BFR may be further referred to as an OAM test apparatus. The first BFR includes:

a receiving unit 402, configured to receive an operation, administration and maintenance OAM request packet from a bit-forwarding ingress router BFIR, where the OAM request packet includes an identifier ID of the BFIR, a set identifier corresponding to at least one bit-forwarding egress router BFER, and a bit string corresponding to the at least one BFER, and the OAM request packet is used for testing a link between the BFIR and the at least one BFER;

a destination determining unit 404, configured to determine, according to the OAM request packet, that a destination BFR corresponding to the OAM request packet is the first BFR;

a first obtaining unit 406, configured to obtain a first OAM response packet according to the ID of the BFIR, where the first OAM response packet includes an ID of the first BFR and a set identifier and a bit string that are corresponding to the BFIR; and a first sending unit 408, configured to send the first OAM response packet to the BFIR.

In an optional embodiment, the first BFR is a BFER among the at least one BFER, for example, the first BFER in FIG. 1.

The destination determining unit 404 is specifically configured to determine, according to the set identifier and the bit string that are included in the OAM request packet, that the at least one BFER includes the first BFR; and the destination determining unit 404 is specifically configured to determine that the destination BFR corresponding to the OAM request packet is the first BFR.

Further, the OAM request packet further includes a type length value TLV, and the TLV is used to carry the set identifier, the bit string, and a length of the bit string; and the first BFR further includes:

a verification unit 405, configured to determine, according to the TLV included in the OAM request packet, that the at least one BFER includes the first BFR; where the verification unit 405 is configured to verify that the destination BFR of the OAM request packet is the first BFR.

Further, the verification unit 405 is further configured to obtain an ID of the at least one BFER according to the set identifier, the bit string, and the length of the bit string that are carried in the TLV;

the verification unit 405 is further configured to check whether an ID of the first BFR is included in the ID of the at least one BFER; and if the ID of the first BFR is included in the ID of the at least one BFER, the verification unit 405 is further configured to determine that the at least one BFER includes the first BFR.

In another optional embodiment, the first BFR is a BFR on the link between the BFIR and the at least one BFER, for example, the intermediate BFR1 in FIG. 1. A packet header of the OAM request packet includes a time-to-live TTL;

the destination determining unit 404 is configured to decrease a value of the TTL by a preset value; and the destination determining unit 404 is configured to: determine that the value of the TTL obtained after the preset value is deducted reaches 0, and determine that the destination BFR corresponding to the OAM request packet is the first BFR.

Optionally, the first BFR further includes a second sending unit, and the destination determining unit 404 is further configured to: determine that the value of the TTL obtained after the preset value is deducted does not reach 0, and determine that the destination BFR corresponding to the OAM request packet is not the first BFR; and the second sending unit is further configured to forward the OAM request packet to the at least one BFER.

The second sending unit and the first sending unit 408 may be a same unit, or may be different units. In FIG. 5, that the two units are the same unit, that is, the first sending unit 408, is used as an example for description.

In a further embodiment, the first obtaining unit 406 is specifically configured to obtain, according to the ID of the BFIR, the set identifier and the bit string that are corresponding to the BFIR;

the first obtaining unit 406 is specifically configured to obtain a second OAM response packet according to the bit string corresponding to the BFIR, where a packet header of the second OAM response packet includes the bit string corresponding to the BFIR and the ID of the first BFR, and a payload of the second OAM response packet includes an OAM packet; and the first obtaining unit 406 is specifically configured to obtain the first OAM response packet by inserting a bit indexed explicit replication multiprotocol label switching label BIER-MPLS Label into the second OAM response packet according to the set identifier corresponding to the BFIR, where the BIER-MPLS Label includes a label corresponding to the set identifier corresponding to the BFIR.

Optionally, the first obtaining unit 406 is further configured to obtain an ID of a second BFR, where the second BFR is a previous hop of the first BFR on the link between the BFIR and the at least one BFER; and the first obtaining unit 406 is further configured to add the ID of the second BFR into the payload of the second OAM response packet.

The OAM response packet includes a first bit and a second bit, the first bit is used to identify the OAM response packet as an OAM packet, and the second bit is used to identify a type of the OAM response packet as a response.

In conclusion, according to this embodiment, an OAM request packet from a BFIR is received; it is determined, according to the OAM request packet, that a destination BFR corresponding to the OAM request packet is a first BFR; an OAM response packet is obtained according to an ID of the BFIR; and the OAM response packet is sent to the BFIR. This resolves a problem that the BFIR cannot diagnose or handle a transmission fault when the fault occurs during transmission of a multicast packet, so that connectivity testing can be implemented by using an OAM packet and multiple BFERs can be diagnosed at the same time.

In this embodiment, a TTL of a BIER-MPLS Label of the OAM request packet is further set to different values, so that the BFIR can test each BFR on a forwarding path, and a forwarding fault can be quickly located.

In this embodiment, after receiving the OAM request packet, a BFR further generates an OAM reply packet according to the OAM request packet, and adds information such as a timestamp, a reply code, and a serial number into the OAM reply packet, so that when receiving the OAM reply packet, the BFIR can analyze information in the OAM reply packet, thereby increasing usage scenarios of the OAM packet.

Figure 6:
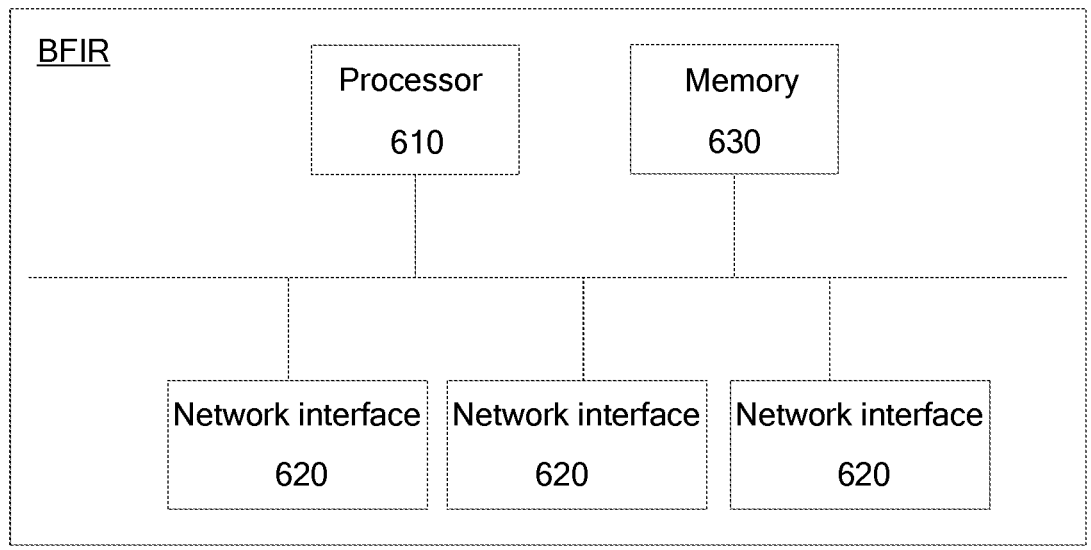
FIG. 6 is a structural block diagram of a BFIR according to an embodiment of the present invention.

Referring to FIG. 6, FIG. 6 shows a block diagram of a BFIR according to an embodiment of the present invention. The BFIR may be the BFIR in FIG. 1. The BFIR may include: a processor 610, at least one network interface 620, and a memory 630. The processor 610 is electrically connected to the at least one network interface 620 and the memory 630 separately. The memory 630 stores one or more instructions, and the processor 610 is configured to perform the one or more instructions.

The processor 610 is configured to obtain a first operation, administration and maintenance OAM request packet according to an identifier ID of at least one bit-forwarding egress router BFER, where the first OAM request packet includes an ID of the BFIR, a set identifier, and a bit string corresponding to the at least one BFER, the set identifier is corresponding to the at least one BFER, and the first OAM request packet is used for testing a link between the BFIR and the at least one BFER; and the processor 610 is configured to send the first OAM request packet to the at least one BFER by using the network interface 620.

Optionally, the first OAM request packet further includes a type length value TLV, and the TLV is used to carry the set identifier, the bit string, and a length of the bit string.

Optionally, the processor 610 is configured to: obtain the set identifier and the bit string according to the ID of the at least one BFER; obtain a second OAM request packet according to the bit string, where a packet header of the second OAM request packet includes the bit string and the ID of the BFIR, and a payload of the second OAM request packet includes an OAM packet; and obtain the first OAM request packet by inserting a first bit indexed explicit replication multiprotocol label switching label BIER-MPLS Label into the second OAM request packet according to the set identifier, where the first BIER-MPLS Label includes a label corresponding to the set identifier.

Optionally, the first OAM request packet is used for testing a link between the BFIR and a first BFR, and the first BFR is a device on the link between the BFIR and the at least one BFER; and the processor 610 is configured for the BFIR to determine a first TTL, where a value of the first TTL is M, and M is used to identify a hop count before the first OAM request packet arrives at the first BFR from the BFIR; and add the first TTL into the first OAM request packet.

Optionally, the processor 610 is further configured to receive a first OAM response packet from the first BFR by using the network interface 620, where the first OAM response packet includes an ID of a third BFR, an ID of the first BFR, a set identifier corresponding to the BFIR, and a bit string corresponding to the BFIR, and the third BFR is a previous hop of the first BFR on the link between the BFIR and the at least one BFER;

the processor 610 is further configured to obtain a second TTL according to the first OAM response packet and the first TTL, where a value of the second TTL is a result of adding a preset value to the value of the first TTL;

the processor 610 is further configured to obtain a third OAM request packet by inserting a second BIER-MPLS Label into the second OAM request packet according to the second TTL and the set identifier, where the second BIER-MPLS Label includes the label corresponding to the set identifier and the second TTL, the third OAM request packet is used for testing a link between the BFIR and a second BFR, and the second BFR is a next hop of the first BFR on the link between the BFIR and the at least one BFER; and the processor 610 is further configured to send the third OAM request packet to the second BFR by using the network interface 620.

Optionally, the second BFR is a BFER.

Optionally, the processor 610 is further configured to receive an OAM response packet from the first BFER by using the network interface 620, where the OAM response packet includes an ID of the first BFER, the set identifier corresponding to the BFIR, and the bit string corresponding to the BFIR.

Optionally, the second OAM request packet includes a first bit and a second bit, the first bit is used to identify the second OAM request packet as an OAM packet, and the second bit is used to identify a type of the second OAM request packet as a request.

Figure 7:
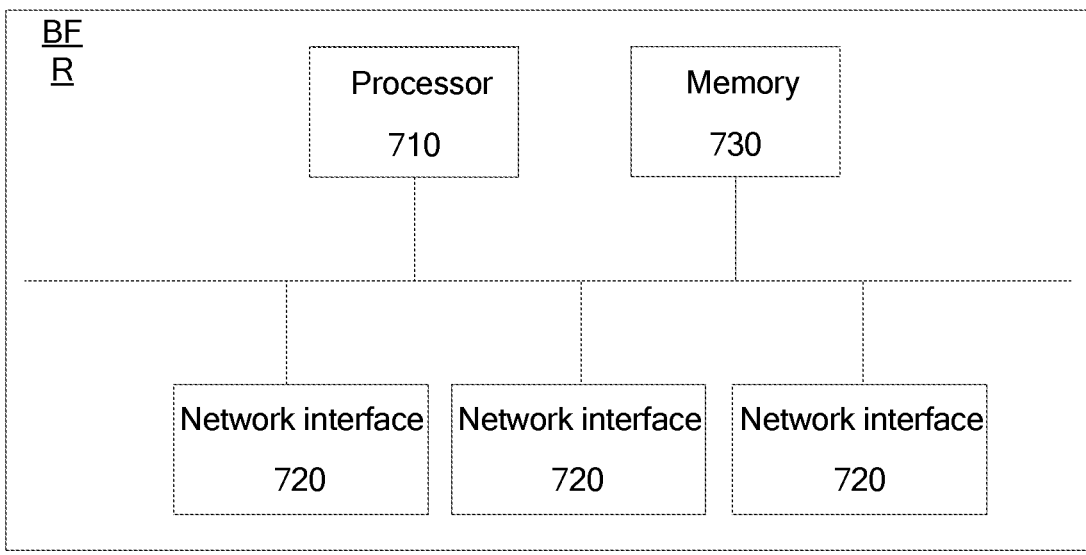
FIG. 7 is a structural block diagram of a BFR according to another embodiment of the present invention.

Referring to FIG. 7, FIG. 7 shows a block diagram of a BFR according to an embodiment of the present invention. The BFR may be the intermediate BFR1, the intermediate BFR2, the first BFER, or the second BFER shown in FIG. 1. The BFR may include: a processor 710, at least one network interface 720, and a memory 730. The processor 710 is electrically connected to the at least one network interface 720 and the memory 730 separately. The memory 730 stores one or more instructions, and the processor 710 is configured to perform the one or more instructions.

The processor 710 is configured to receive an operation, administration and maintenance OAM request packet from a bit-forwarding ingress router BFIR by using the network interface 720, where the OAM request packet includes an identifier ID of the BFIR, a set identifier, and a bit string corresponding to the at least one BFER, the set identifier is corresponding to the at least one BFER, and the OAM request packet is used for testing a link between the BFIR and the at least one BFER;

the processor 710 is configured to determine, according to the OAM request packet, that a destination BFR corresponding to the OAM request packet is the first BFR;

the processor 710 is configured to obtain a first OAM response packet according to the ID of the BFIR, where the OAM response packet includes an ID of the first BFR, a set identifier corresponding to the BFIR, and a bit string corresponding to the BFIR; and the processor 710 is configured to send the first OAM response packet to the BFIR by using the network interface 720.

Optionally, the first BFR is a BFER among the at least one BFER, for example, the first BFER in FIG. 1.

The processor 710 is configured to determine, according to the set identifier and the bit string that are included in the OAM request packet, that the at least one BFER includes the first BFR; and the processor 710 is configured to determine that the destination BFR corresponding to the OAM request packet is the first BFR.

Optionally, the OAM request packet further includes a TLV, and the TLV is used to carry the set identifier and the bit string that are corresponding to the at least one BFER, and a length of the bit string.

The processor 710 is specifically configured to determine, according to the TLV included in the OAM request packet, that the at least one BFER includes the first BFR; and the first BFR verifies that the destination BFR of the OAM request packet is the first BFR.

Further, the processor 710 is specifically configured to: obtain an ID of the at least one BFER according to the set identifier, the bit string, and the length of the bit string that are carried in the TLV; check whether an ID of the first BFR is included in the ID of the at least one BFER; and if the ID of the first BFR is included in the ID of the at least one BFER, determine that the at least one BFER includes the first BFR.

Optionally, the first BFR is a BFR on the link between the BFIR and the at least one BFER, for example, the intermediate BFR1 in FIG. 1. A packet header of the OAM request packet includes a TTL; and the processor 710 is configured to: decrease a value of the TTL by a preset value; and if it is determined that the value of the TTL obtained after the preset value is deducted reaches a preset threshold, determine that the destination BFR corresponding to the OAM request packet is the first BFR.

The processor 710 is configured to: if it is determined that the value of the TTL obtained after the preset value is deducted does not reach the preset threshold, determine that the destination BFR corresponding to the OAM request packet is not the first BFR; and the processor 710 is configured to send the OAM request packet to the at least one BFER by using the network interface 720.

The processor 710 is specifically configured to:

obtain, according to the ID of the BFIR, the set identifier and the bit string that are corresponding to the BFIR;

obtain a second OAM response packet according to the bit string corresponding to the BFIR, where a packet header of the second OAM response packet includes the bit string corresponding to the BFIR and the ID of the first BFR, and a payload of the second OAM response packet includes an OAM packet; and obtain the first OAM response packet by inserting a bit indexed explicit replication multiprotocol label switching label BIER-MPLS Label into the second OAM response packet according to the set identifier corresponding to the BFIR, where the BIER-MPLS Label includes a label corresponding to the set identifier corresponding to the BFIR.

The processor 710 is specifically configured to obtain an ID of a second BFR, where the second BFR is a previous hop of the first BFR on the link between the BFIR and the at least one BFER; and the processor 710 is specifically configured to add the ID of the second BFR into the payload of the second OAM response packet.

Optionally, the OAM response packet includes a first bit and a second bit, the first bit is used to identify the OAM response packet as an OAM packet, and the second bit is used to identify a type of the OAM response packet as a response.

The OAM packet provided in this embodiment of the present invention may be classified into an OAM request packet and an OAM response packet, and a structure of packet content of the OAM request packet is similar to that of the OAM response packet, each of which includes an OAM packet header and a payload.

The OAM packet header may include version information, a protocol type, a length, entropy, a bit string, a reserved area, and a bit-forwarding ingress router identifier. A structure of the OAM packet header may be shown in FIG. 12.

Version information: The version information is generally set to 0 to avoid confusion with an IP packet header.

Protocol type: The protocol type field is used to identify a type of a payload in a packet.

Length: The length is used to identify a length of a bit string. For example, when the length is 1, it indicates that the length of the bit string is 64 bits; when the length is 2, it indicates that the length of the bit string is 128 bits.

Entropy: This field is used to implement load balancing.

Bit string: The bit string is used to indicate a destination BFER of an OAM packet together with a set identifier carried in a BIER-MPLS Label of an OAM packet.

Reserved area: This field may be voluntarily set. For example, in this embodiment of the present invention, a first bit may separated from the reserved area, and when being set, that is, being set to 1 from 0, the first bit is used to identify a current packet as an OAM packet.

Bit-forwarding ingress router identifier: This field is generally used to store an identifier of a BFIR that sends an OAM request packet, that is, an ID of the BFIR.

The payload area of the OAM packet may include: a version number, a packet type, a reserved area, a reply mode, a reply code, a bit-forwarding router identifier, a previous-hop bit-forwarding router identifier, a sender identifier, a serial number, a sending timestamp, a receiving timestamp, and a type length value. A structure of the payload area may be shown in FIG. 13.

Version number: This field is used to store version number information.

Packet type: This field includes a second bit, the second bit is used to identify a packet type of the OAM packet, and the packet type includes a request type and a response type. When the second bit is set to 0, it indicates that the packet type is the request type, that is, the OAM packet is an OAM request packet; when the second bit is set to 1, it indicates that the packet type is the response type, that is, the OAM packet is an OAM response packet.

Reserved area: This field may be voluntarily set.

Reply mode: This field is used to store a protocol of an OAM response packet. The BIER protocol is used as an example for description in this embodiment of the present invention, which does not constitute a limitation on the present disclosure.

Reply code: It is a code generated after a BFR performs testing for an OAM packet, and each reply code is corresponding to a testing result.

Bit-forwarding router identifier: When the OAM packet is an OAM reply packet, this field stores an identifier of a BFR that sends the OAM response packet.

Previous-hop bit-forwarding router identifier: When the OAM packet is an OAM response packet, this field stores an identifier of a previous-hop BFR of a BFR that sends the OAM response packet.

Sender identifier: an identifier of a bit-forwarding ingress router that sends an OAM request packet.

Serial number: This field is used to distinguish between different OAM packets, and an OAM request packet and a corresponding OAM response packet have different serial numbers.

Sending timestamp: It is used to record a time at which an OAM packet is sent.

Receiving timestamp: It is used to record a time at which an OAM packet is received.

Type length value: This field carries a set identifier, a bit string, and a length of the bit string, and the type length value is used for testing whether a current BFR is a destination BFER of an OAM request packet.

The type length value includes: a type (Type), a length (Length) of the TLV, a set identifier, a length of a bit string (BitStringLength), and a bit string. A structure of the type length value may be shown in FIG. 14.

The type is used to identify information included in the type length value field. When the type is set to 1, it indicates that the type length value field includes a set identifier and a bit string.

It should be noted that in another implementation manner, the type length value may alternatively be classified into two type length values for indication: one is a type length value carrying the set identifier, and the other is a type length value carrying the bit string. This embodiment of the present invention imposes no limitation thereto, but gives illustrative description by using only FIG. 14 as an example.

It should be further noted that MPLS encapsulation further needs to be performed for the foregoing OAM packet, and a corresponding BIER-MPLS Label needs to be inserted into the OAM packet, so as to obtain a final OAM request packet or a final OAM reply packet.

The BIER-MPLS Label mainly includes a label and a time-to-live (TTL). The label is a label corresponding to a set identifier of a destination BFR of an OAM packet. The TTL is a value that is decreased by a preset value each time the OAM packet passes through one BFR. For example, the TTL is decreased by 1 each time the OAM packet passes through one BFR. When a value of the TTL is decreased to 0, a BFR at which the OAM packet is currently located needs to process packet content in the OAM packet. If the OAM packet is an OAM request packet, a current BFR records information in the OAM request packet; or if the OAM packet is an OAM reply packet, the current BFR generates an OAM reply packet according to the OAM request packet.

Figure 8:
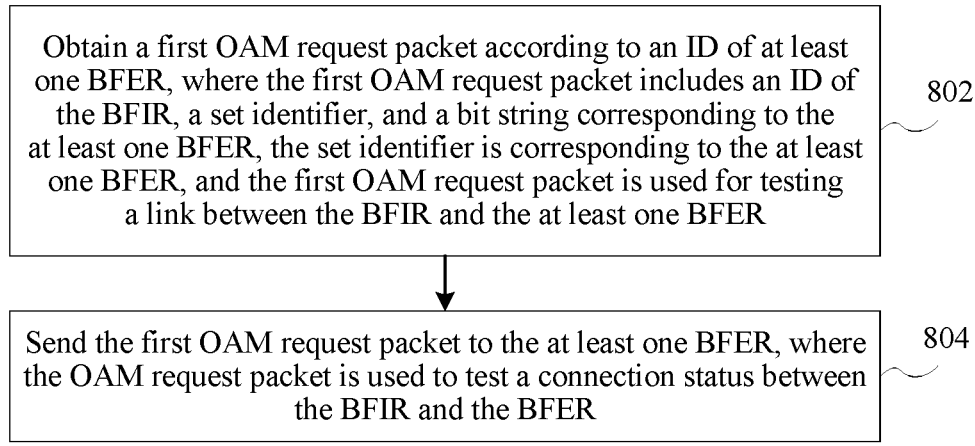
FIG. 8 is a method flowchart of an OAM test method according to an embodiment of the present invention.

Referring to FIG. 8, FIG. 8 shows a method flowchart of an OAM test method according to an embodiment of the present invention. In this embodiment, that the OAM test method is applied to the BFIR shown in FIG. 1 is used as an example for description, and the method may include the following steps:

Step 802: Obtain a first OAM request packet according to an ID of at least one BFER, where the first OAM request packet includes an ID of the BFIR, a set identifier, and a bit string corresponding to the at least one BFER, the set identifier is corresponding to the at least one BFER, and the first OAM request packet is used for testing a link between the BFIR and the at least one BFER.

Step 804: Send the first OAM request packet to the at least one BFER, where the OAM request packet is used for testing a connection status between the BFIR and the BFER.

In conclusion, according to the OAM test method provided in this embodiment, a first OAM request packet is obtained according to an ID of at least one BFER; and the OAM request packet is sent to the at least one BFER, where the OAM request packet is used for testing a connection status between a BFIR and a BFER. This resolves a problem that the BFIR cannot diagnose or handle a transmission fault when the fault occurs during transmission of a multicast packet, so that connectivity testing can be implemented by using an OAM packet and multiple BFERs can be diagnosed at the same time.

Figure 9:
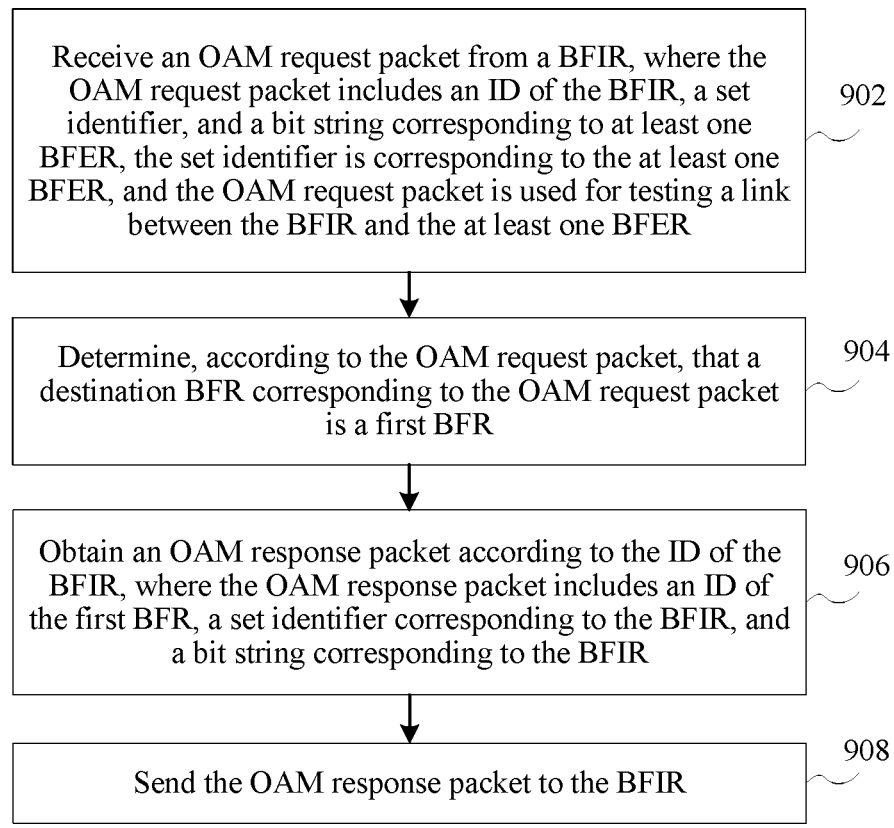
FIG. 9 is a method flowchart of an OAM test method according to another embodiment of the present invention.

Referring to FIG. 9, FIG. 9 shows a method flowchart of an OAM test method according to an embodiment of the present invention. In this embodiment, that the OAM test method is applied to the intermediate BFR or the BFER shown in FIG. 1 is used as an example for description, and the method may include the following steps:

Step 902: Receive an OAM request packet from a BFIR, where the OAM request packet includes an ID of the BFIR, a set identifier, and a bit string corresponding to at least one BFER, the set identifier is corresponding to the at least one BFER, and the OAM request packet is used for testing a link between the BFIR and the at least one BFER.

Step 904: Determine, according to the OAM request packet, that a destination BFR corresponding to the OAM request packet is a first BFR.

Step 906: Obtain an OAM response packet according to the ID of the BFIR, where the OAM response packet includes an ID of the first BFR, a set identifier corresponding to the BFIR, and a bit string corresponding to the BFIR.

Step 908: Send the OAM response packet to the BFIR.

In conclusion, according to the OAM test method provided in this embodiment, an OAM request packet from a BFIR is received; it is determined, according to the OAM request packet, that a destination BFR corresponding to the OAM request packet is a first BFR; an OAM response packet is obtained according to an ID of the BFIR; and the OAM response packet is sent to the BFIR. This resolves a problem that the BFIR cannot diagnose or handle a transmission fault when the fault occurs during transmission of a multicast packet, so that connectivity testing can be implemented by using an OAM packet and multiple BFERs can be diagnosed at the same time.

The foregoing OAM packet may be used for connectivity testing and hop-by-hop testing. The connectivity testing is used to implement a testing function similar to a ping instruction in the Internet. The hop-by-hop testing is used to implement a testing function similar to a trace instruction in the Internet.

First, an embodiment is used to give an exemplary description about connectivity testing for the OAM packet.

Figure 10A:
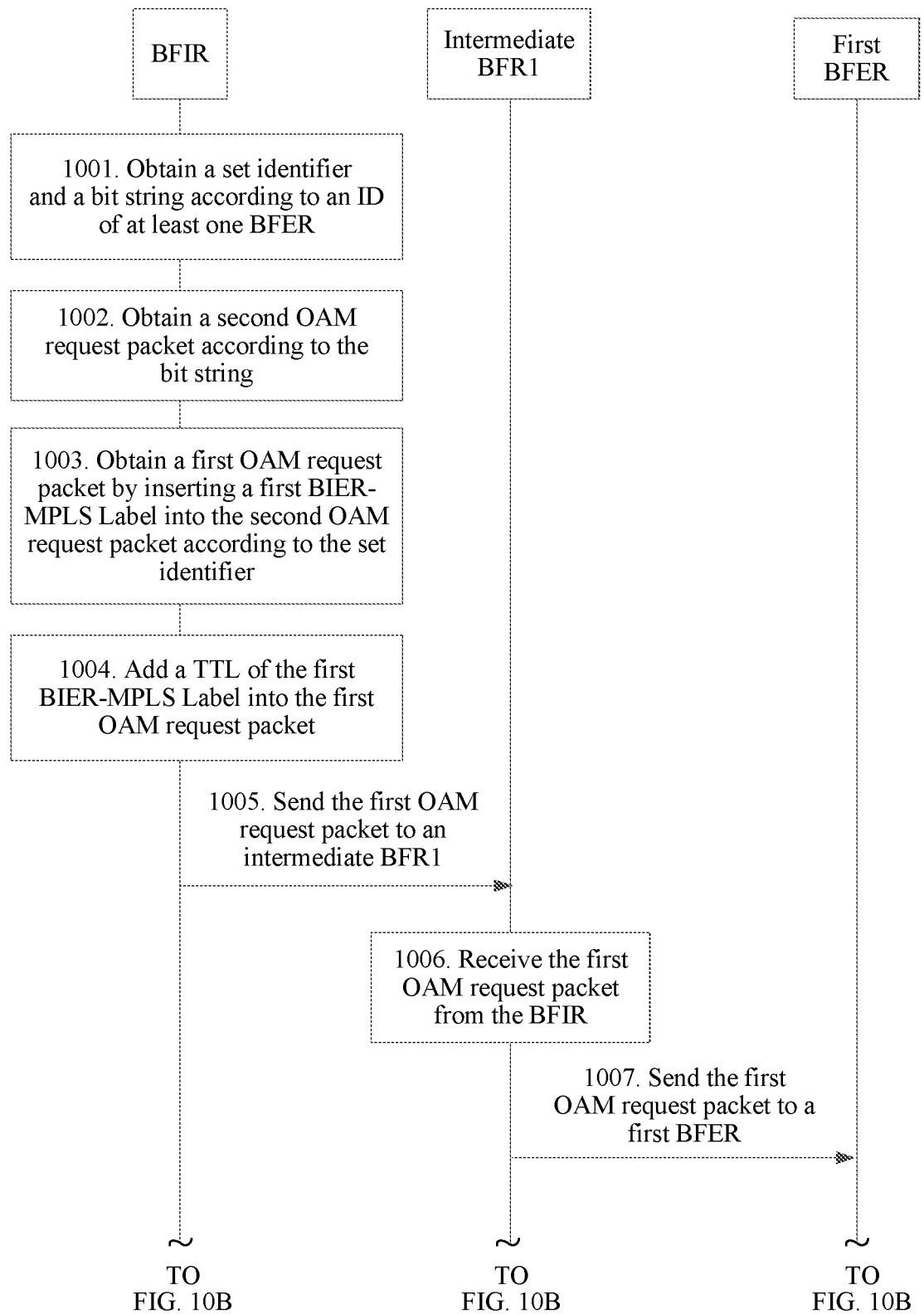
Figure 10C:
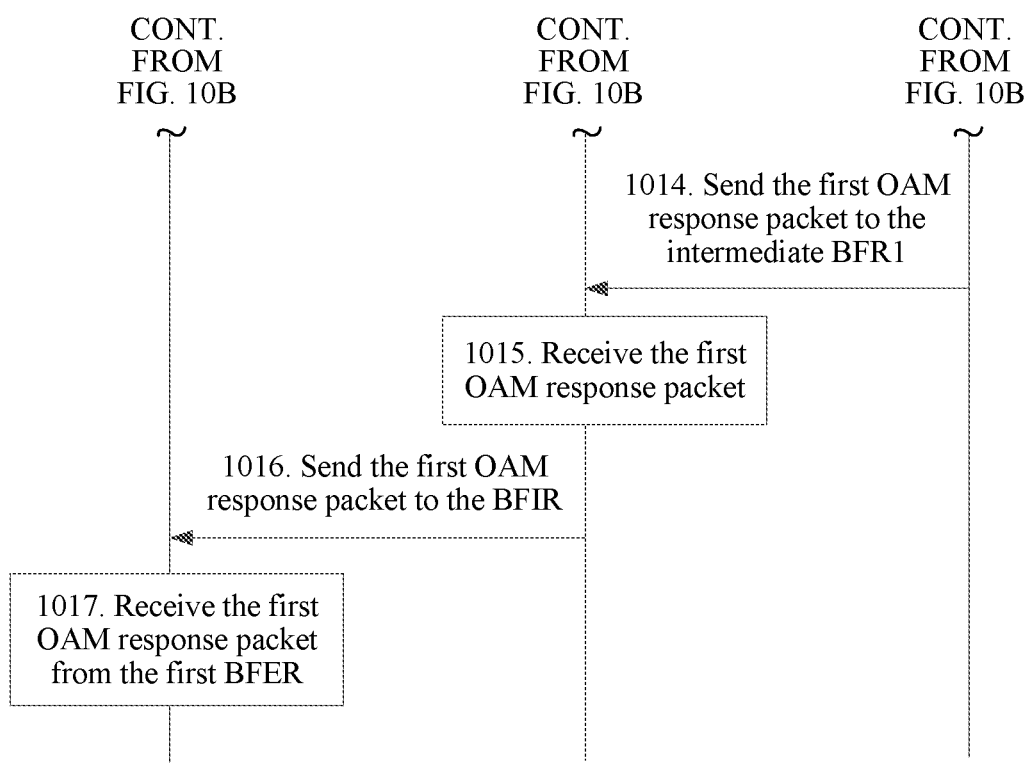

Referring to FIG. 10A to FIG. 10C, FIG. 10A to FIG. 10C show a method flowchart of an OAM test method according to an embodiment of the present invention. In this embodiment, that the OAM test method is applied to the implementation environment shown in FIG. 1 is used as an example for description. The method may include the following steps.

Step 1001: A BFIR obtains a set identifier and a bit string according to an ID of at least one BFER.

As a possible implementation manner, the BFIR may obtain an IP address of the at least one BFER from a multicast flow overlay.

Each BFR in a BIER network stores a mapping table between an ID and an IP address that are of the BFR. Therefore, the BFIR may find, according to the obtained at least one IP address, an ID of a BFER corresponding to each IP address, and obtain, according to the ID, a set identifier and a bit string that are corresponding to each BFER. When being set to 1, a bit that is in the bit string and that is corresponding to the BFER is used to indicate the BFER. A table structure of the mapping table between the ID and the IP address that are of the BFR may be shown in Table 1.

TABLE 1

| ID of a BFR | IP address |
| --- | --- |
| 1 | IP address A |
| 2 | IP address B |
| 3 | IP address C |

For example, the BFIR obtains an IP address B from the multicast flow overlay, and finds, according to the IP address B, that a corresponding ID of the BFR is 2, that is, an ID of a first BFER is 2. It is assumed that a length of the bit string stipulated in the BIER network is 256 bits. It is learned, by means of calculation according to the length of the bit string and the ID, that a set identifier corresponding to the first BFER is 0, and the first 252 bits of a corresponding bit string are 0 and the last four bits are 0010, that is, a bit corresponding to the BFER is a second bit in the bit string.

When the BFIR obtains multiple IP addresses from the multicast flow overlay, the BFIR separately obtains, by means of calculation, set identifiers and bit strings that are corresponding to BFERs, and if the set identifiers are the same, performs a summation operation on the bit strings to obtain a bit string corresponding to the multiple BFERs. Bits that are in the bit string and that are corresponding to the BFERs are set to 1.

For example, the BFIR obtains IP addresses B and C from the multicast flow overlay, and finds that corresponding IDs of the BFRs are 2 and 3, that is, the ID of the first BFER is 2, and an ID of a second BFER is 3. It is assumed that a length of the bit string stipulated in the BIER network is 256 bits. It is learned, by means of calculation according to the length of the bit string and the IDs, that the set identifier corresponding to the first BFER is 0, the last four bits of the corresponding bit string are 0010, a set identifier corresponding to the second BFER is 0, and the last four bits of the corresponding bit string are 0100. A summation operation is performed on the bit strings of the first BFER and the second BFER to obtain a bit string corresponding to both the first BFER and the second BFER, and the last four bits of the bit string are 0110.

Step 1002: The BFIR obtains a second OAM request packet according to the bit string.

The second OAM request packet may be considered as an OAM request packet whose entire content is not completely generated. A packet header of the second OAM request packet includes the bit string that is obtained in the last step and that is corresponding to the at least one BFER and an ID of the BFIR, and a payload of the second OAM request packet includes an OAM packet.

To identify a source of the OAM request packet, the BFIR needs to obtain the ID of the BFIR, and add the ID into the packet header of the second OAM request packet. In addition, the BFIR further needs to add the bit string corresponding to the at least one BFER into the packet header of the second OAM request packet, so as to identify a destination BFER of the second OAM request packet.

To enable the BFR in the BIER network to identify a received packet as an OAM request packet, the BFIR further needs to set a first bit of the packet header of the second OAM request packet, that is, set the first bit to 1 from 0, and identify a packet type as a request type in a second bit of the second OAM request packet.

Optionally, the BFIR may further generate a type length value TLV carrying the set identifier and the bit string that are corresponding to the at least one BFER, and add the TLV into the second OAM request packet.

Step 1003: The BFIR obtains a first OAM request packet by inserting a first BIER-MPLS Label into the second OAM request packet according to the set identifier, where the first BIER-MPLS Label includes a label corresponding to the set identifier.

A BIER-MPLS Label (not shown in FIG. 12) is a label inserted into an OAM packet when MPLS encapsulation is performed on the OAM packet, the label is corresponding to the set identifier of the at least one BFER, and a correspondence between the BIER-MPLS Label and the set identifier of the BFER may be shown in Table 2.

TABLE 2

| BIER-MPLS Label | Set identifier of a BFER |
| --- | --- |
| Label 101 | 1 |
| Label 102 | 2 |
| Label 103 | 3 |

The BFIR determines a corresponding BIER-MPLS Label according to the set identifier of the at least one BFER, and obtains the first OAM request packet by inserting the BIER-MPLS Label into the second OAM request packet.

It should be noted that when the BFIR needs to test links to two or more BFERs, if set identifiers corresponding to the two or more BFERs are the same, that is, a situation shown in this embodiment, corresponding BIER-MPLS Labels are also the same, and the BFIR needs to generate only one first OAM request packet. However, if set identifiers that are respectively corresponding to the two or more BFERs are different, corresponding BIER-MPLS Labels are also different, and the BFIR needs to perform classification according to a same set identifier and generate an OAM request packet for BFERs with a same set identifier. If the BFERs fall into n types, n OAM request packets are generated, and each OAM request packet is used for testing one type of BFER.

Step 1004: The BFIR adds a TTL of the first BIER-MPLS Label into the first OAM request packet.

A TTL is a time-to-live of the BIER-MPLS Label and is used to identify whether the BIER-MPLS Label has expired. The TTL needs to be decreased by a preset value each time the OAM request packet passes through one BFR. When the TTL is decreased to 0, it indicates that the BIER-MPLS Label has expired, and a BFR at which the OAM request packet is currently located needs to reply to the OAM request packet. The preset value is an integer greater than or equal to 1 and is generally 1.

During connectivity testing, to avoid that the first OAM request packet cannot be forwarded to the BFER because the TTL is already decreased to 0 when the first OAM request packet arrives at a BFR between the BFIR and the BFER, the BFIR generally sets the TTL of the first BIER-MPLS Label to a maximum value, and the maximum value is generally 255.

In this case, the BFIR obtains the first OAM request packet, and may test a link between the BFIR and the first BFER by using the first OAM request packet.

Because manners for processing the first OAM request packet by an intermediate BFR1 and an intermediate BFR2 are similar, manners for processing the first OAM request packet by the first BFER and the second BFER are similar. For ease of description, only the manners for processing the first OAM request packet by the intermediate BFR1 and the first BFER are described in the following steps.

Step 1005: The BFIR sends the first OAM request packet to an intermediate BFR1.

Step 1006: The intermediate BFR1 receives the first OAM request packet from the BFIR.

The intermediate BFR1 determines a corresponding set identifier according to the BIER-MPLS Label in the first OAM request packet, and the intermediate BFR1 further obtains a bit string from a packet header of the first OAM request packet.

The intermediate BFR1 obtains, by means of calculation, an ID of at least one destination BFER according to the set identifier and the bit string, and checks whether an ID of the intermediate BFR1 is the ID of the at least one destination BFER.

Because a destination BFER of the first OAM request packet is the first BFER and the second BFER, the intermediate BFR1 checks that the intermediate BFR1 is not the destination BFER of the first OAM request packet.

In addition, the intermediate BFR1 obtains the TTL from the BIER-MPLS Label in the first OAM request packet, decreases the TTL by a preset value, and determines whether a TTL obtained after the preset value is deducted is 0. If the resultant TTL is not 0, after performing label switching on the BIER-MPLS Label in the first OAM request packet, the intermediate BFR1 forwards the first OAM request packet to a next-hop BFR, that is, the first BFER.

That is, in this embodiment, the intermediate BFR1 learns, from the BIER-MPLS Label in the first OAM request packet, that the TTL is 255, decreases the TTL by 1, and determines whether the resultant TTL=244 after 1 is deducted is 0. If the resultant TTL is not 0, after performing label switching on the BIER-MPLS Label in the first OAM request packet, the intermediate BFR1 sends the first OAM request packet to the first BFER.

For a label switching technology, refer to the MPLS label switching technology. Details are not described in this specification.

Step 1007: The intermediate BFR1 sends the first OAM request packet to a first BFER.

Step 1008: The first BFER receives the first OAM request packet.

Step 1009: The first BFER determines, according to the first OAM request packet, that a destination BFR corresponding to the first OAM request packet is the first BFER.

This step may further include the following steps.

1. The first BFER determines, according to the set identifier and the bit string that are included in the first OAM request packet, that the at least one BFER includes the first BFER.

The first BFER obtains the bit string of the first OAM request packet and the set identifier corresponding to the BIER-MPLS Label, and obtains, by means of calculation, the ID of the at least one destination BFER according to the set identifier and the bit string. The first BFER checks whether the ID of the at least one destination BFER includes an ID of a current BFER.

2. The first BFER determines that the destination BFR corresponding to the first OAM request packet is the first BFER.

When checking that the ID of the at least one destination BFER includes the ID of the current BFER, that is, determining that the destination BFR corresponding to the first OAM request packet is the first BFER, the first BFER needs to respond to the first OAM request packet.

Step 1010: The first BFER obtains, according to the ID of the BFIR, the set identifier and the bit string that are corresponding to the BFIR.

After receiving the first OAM request packet, the first BFER needs to learn a BFIR to which an OAM response packet is sent, so as to notify the BFIR that a link to the BFER is connected. Therefore, the first BFER needs to obtain the ID of the BFIR from the packet header of the first OAM request packet, and obtain, according to the ID, the set identifier and the bit string that are corresponding to the BFIR.

Step 1011: The first BFER obtains a second OAM response packet according to the bit string corresponding to the BFIR.

The second OAM response packet may be considered as an OAM response packet whose entire content is not completely generated. A packet header of the second OAM response packet includes the bit string corresponding to the BFIR and the ID of the first BFER, and a payload of the second OAM response packet includes an OAM packet.

The first BFER adds the bit string corresponding to the BFIR into the packet header of the second OAM response packet, so as to identify a destination BFR of the second OAM response packet as a BFIR.

To identify a source of the second OAM response packet, the first BFER needs to obtain the ID of the first BFER, and add the ID into the packet header of the second OAM response packet. In addition, the first BFER further needs to add the bit string corresponding to the first BFER into the packet header of the second OAM response packet, so as to identify the source of the second OAM response packet as the first BFER.

To enable the BFR in the BIER network to identify a received packet as an OAM response packet, the first BFER further needs to set a first bit of the packet header of the second OAM response packet, that is, set the first bit to 1 from 0, and identify a packet type as a response type in a second bit of the second OAM response packet.

Optionally, the first BFER further obtains the ID of the intermediate BFR1, and the intermediate BFR1 is a previous-hop BFR that is on the link between the BFIR and the first BFER and that is of the first BFER.

The first BFER adds the ID of the intermediate BFR1 into a previous-hop bit-forwarding router field in the payload of the second OAM response packet.

It should be noted that this embodiment imposes no limitation on a manner for obtaining the ID of the intermediate BFR1 by the first BFER. As a possible implementation manner, before sending the first OAM request packet to the first BFER, the intermediate BFR1 may add the ID of the intermediate BFR1 into the first OAM request packet. Correspondingly, the first BFER may obtain the ID of the intermediate BFR1 from the first OAM request packet. As another possible implementation manner, the first OAM request packet is sent by the intermediate BFR1 to the first BFER, and a label in the first OAM request packet is a label agreed upon between the intermediate BFR1 and the first BFER. Therefore, the first BFER may also learn the ID of the intermediate BFR1 by using the label.

Optionally, the first BFER may further check, according to the TLV in the OAM request packet, whether the current BFER is the destination BFER of the OAM request packet, which may include the following steps.

1. The first BFER determines, according to the TLV included in the OAM request packet, that the at least one BFER includes the first BFER.

The first BFER obtains the ID of the at least one BFER according to the set identifier, the bit string, and the length of the bit string that are carried in the TLV; the first BFER checks whether the ID of the first BFER is included in the ID of the at least one BFER; and if the ID of the first BFER is included in the ID of the at least one BFER, the first BFER determines that the at least one destination BFER corresponding to the OAM request packet includes the first BFER.

2. The first BFER verifies that the destination BFR of the OAM request packet is the first BFER.

In this case, the first BFER may further generate a corresponding reply code according to a verification result.

For example, a reply code 1 indicates that the first BFER is the destination BFR of the OAM request packet, a reply code 0 indicates that the first BFER is not the destination BFR of the OAM request packet, and the first BFER generates the reply code 1, and adds the reply code 1 into a reply code field in a payload of a second OAM reply packet.

Step 1012: The first BFER obtains a first OAM response packet by inserting a BIER-MPLS Label into the second OAM response packet according to the set identifier corresponding to the BFIR.

The BIER-MPLS Label includes a label corresponding to the set identifier corresponding to the BFIR.

The first BFER determines a corresponding BIER-MPLS Label according to the set identifier corresponding to the BFIR, and obtains, by inserting the BIER-MPLS Label into the second OAM response packet, the first OAM response packet on which the MPLS encapsulation is performed.

Step 1013: The first BFER adds a TTL of the BIER-MPLS Label into the first OAM response packet.

To avoid that the first OAM response packet cannot be forwarded to the BFIR because the TTL is already decreased to 0 when the first OAM response packet arrives at a BFR between the BFER and the BFIR, the first BFER sets the TTL to a maximum value. Generally, the TTL is set to 255.

Step 1014: The first BFER sends the first OAM response packet to the intermediate BFR1.

Step 1015: The intermediate BFR1 receives the first OAM response packet.

The intermediate BFR1 obtains a set identifier corresponding to a BIER-MPLS Label of the first OAM response packet and a bit string in a packet header of the first OAM response packet, obtains, by means of calculation, the ID of the BFIR according to the set identifier and the bit string, and checks whether the ID of the intermediate BFR1 is consistent with the ID of the BFIR. When the two IDs are inconsistent, the intermediate BFR1 determines that a destination BFR of the first OAM response packet is not the intermediate BFR1.

In addition, the intermediate BFR1 obtains the TTL from the BIER-MPLS Label in the first OAM response packet, decreases the TTL by a preset value, and determines whether a TTL obtained after the preset value is deducted is 0. If the resultant TTL is not 0, after performing label switching on the BIER-MPLS Label in the first OAM response packet, the intermediate BFR1 forwards the first OAM response packet to a next-hop BFR, that is, the BFIR.

Step 1016: The intermediate BFR1 sends the first OAM response packet to the BFIR.

Step 1017: The BFIR receives the first OAM response packet from the first BFER.

The first OAM response packet includes the ID of the first BFER and the set identifier and the bit string that are corresponding to the BFIR.

The BFIR obtains a set identifier corresponding to a BIER-MPLS Label of the first OAM response packet and a bit string in a packet header of the first OAM response packet, obtains, by means of calculation, the ID of the BFIR according to the set identifier and the bit string, and checks whether the ID of the BFIR is consistent with the ID of the BFIR. When the two IDs are consistent, the BFIR determines that a destination BFR of the first OAM response packet is the BFIR.

When the BFIR determines that the destination BFR of the first OAM response packet is the BFIR, the BFIR processes packet content of the first OAM response packet.

The BFIR checks whether a first bit in the packet header of the first OAM response packet is set, and when checking that the first bit is set, determines that the packet is an OAM packet; further, when checking that a packet type of the OAM packet is a reply type, the BFIR determines that the OAM packet is the first OAM response packet.

When determining that the packet is the first OAM response packet, the BFIR may further obtain information such as a timestamp and a reply code according to the payload of the first OAM response packet.

For example, the BFIR obtains, by means of calculation, a transmission delay of the first OAM response packet according to the timestamp in the payload.

For another example, the BFIR may obtain a testing result of the first OAM request packet according to the reply code in the payload.

For still another example, the BFIR may learn information such as a transmission path of the first OAM request packet according to the ID of the first BFIR, the ID of the intermediate BFR1, and the reply code that are carried in the first OAM response packet.

It should be noted that after sending the first OAM request packet, the BFIR sets a timer, and when not receiving the first OAM response packet from the BFER within preset duration, may determine that the BFIR is not connected to the BFER.

It should be further noted that the manners for processing the first OAM request packet by the intermediate BFR2 and the second BFER are similar to those in steps 1006 to 1017. Therefore, if the network environment shown in FIG. 1 is not faulty, the BFIR receives the first OAM response packet separately from the first BFER and the second BFER after sending the first OAM request packet, thereby implementing connectivity testing for multiple BFERs at the same time.

In conclusion, according to this embodiment, a first OAM request packet is obtained according to an ID of at least one BFER; and the OAM request packet is sent to the at least one BFER, where the OAM request packet is used for testing a connection status between a BFIR and a BFER. This resolves a problem that the BFIR cannot diagnose or handle a transmission fault when the fault occurs during transmission of a multicast packet, so that connectivity testing can be implemented by using an OAM packet and multiple BFERs can be diagnosed at the same time.

In this embodiment, a first bit in a packet header of a packet is further set, and when receiving the packet, a BFR can identify the packet as an OAM packet by using the first bit, so that the BFR quickly distinguishes between the OAM packet and a BIER multicast packet, thereby improving forwarding efficiency of the BFR.

In this embodiment, after receiving the OAM request packet, the BFR further generates an OAM response packet according to the OAM request packet, and adds information such as a timestamp, a reply code, and a serial number into the OAM response packet, so that when receiving the OAM response packet, the BFIR can learn a situation such as a network delay according to information in the OAM response packet, thereby increasing usage scenarios of the OAM packet.

In the following, another embodiment is used to give an exemplary description about hop-by-hop testing for the OAM packet.

Figure 11A:
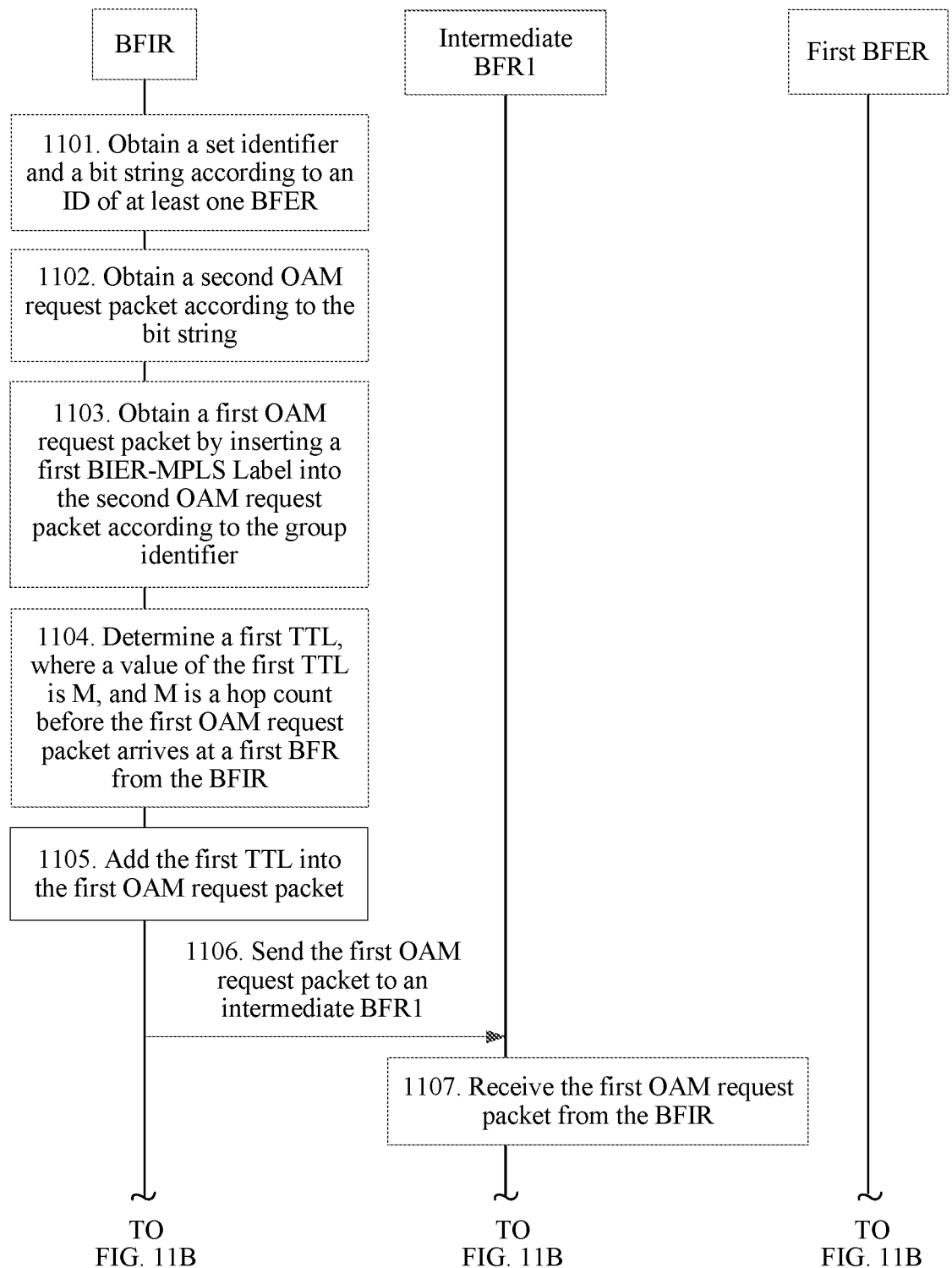
FIG. 11A to FIG. 11C show a method flowchart of an OAM test method according to yet another embodiment of the present invention.
Figure 11B:
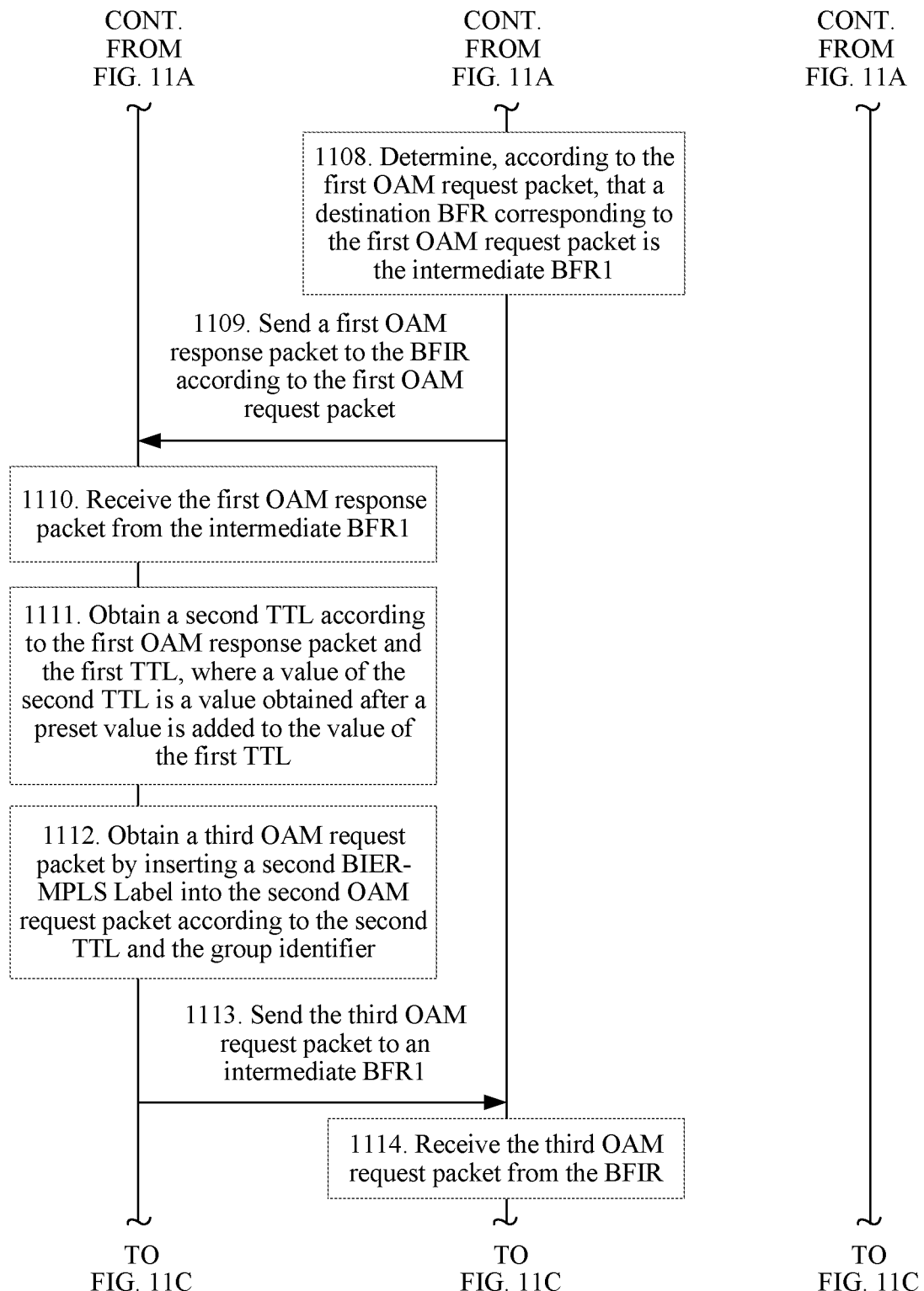
Figure 11C:
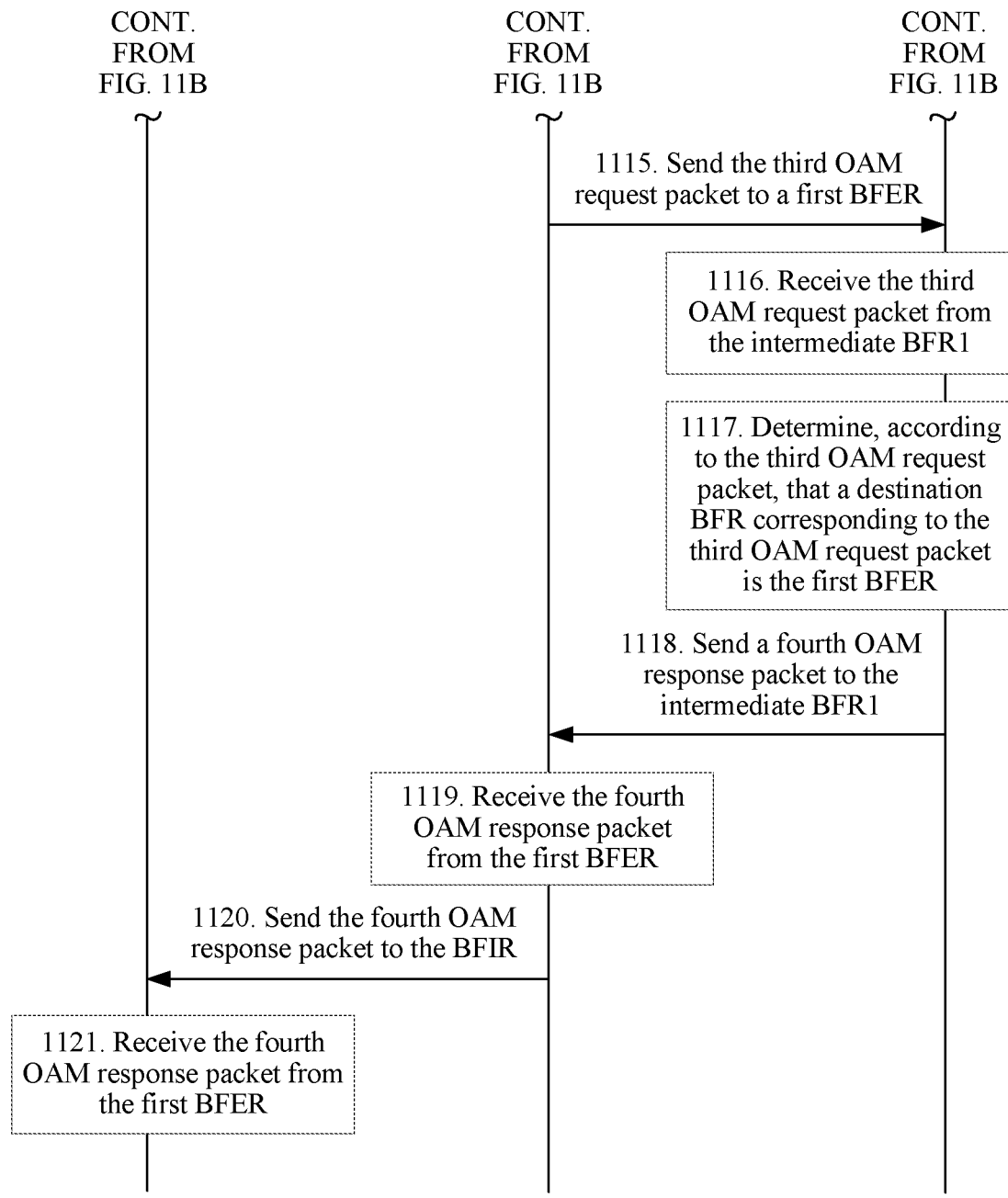

As shown in FIG. 11A to FIG. 11C, FIG. 11A to FIG. 11C show a method flowchart of an OAM test method according to yet another embodiment of the present invention. In this embodiment, that the OAM test method is applied to the implementation environment shown in FIG. 1 is used as an example for description, and the method may include the following steps.

Step 1101: A BFIR obtains a set identifier and a bit string according to an ID of at least one BFER.

As a possible implementation manner, the BFIR may obtain an IP address of the at least one BFER from a multicast flow overlay.

Each BFR in a BIER network stores a mapping table between an ID and an IP address that are of the BFR. Therefore, the BFIR may find, according to the obtained at least one IP address, an ID of a BFER corresponding to each IP address, and obtain, according to the ID, a set identifier and a bit string that are corresponding to each BFER. When being set to 1, a bit that is in the bit string and that is corresponding to the BFER is used to indicate the BFER. A table structure of the mapping table between the ID and the IP address that are of the BFR may be shown in Table 3.

TABLE 3

| ID of a BFR | IP address |
| --- | --- |
| 1 | IP address A |
| 2 | IP address B |
| 3 | IP address C |

For example, the BFIR obtains an IP address B from the multicast flow overlay, and finds, according to the IP address B, that a corresponding ID of the BFR is 2, that is, an ID of a first BFER is 2. It is assumed that a length of the bit string stipulated in the BIER network is 256 bits. It is learned, by means of calculation according to the length of the bit string and the ID, that a set identifier corresponding to the first BFER is 0, and the first 252 bits of a corresponding bit string are 0 and the last four bits are 0010, that is, a bit corresponding to the BFER is a second bit in the bit string.

When the BFIR obtains multiple IP addresses from the multicast flow overlay, the BFIR separately obtains, by means of calculation, set identifiers and bit strings that are corresponding to BFERs, and if the set identifiers are the same, performs a summation operation on the bit strings to obtain a bit string corresponding to the multiple BFERs. Bits that are in the bit string and that are corresponding to the BFERs are set to 1.

For example, the BFIR obtains IP addresses B and C from the multicast flow overlay, and finds that corresponding IDs of the BFRs are 2 and 3, that is, the ID of the first BFER is 2, and an ID of a second BFER is 3. It is assumed that a length of the bit string stipulated in the BIER network is 256 bits. It is learned, by means of calculation according to the length of the bit string and the IDs, that the set identifier corresponding to the first BFER is 0, the last four bits of the corresponding bit string are 0010, a set identifier corresponding to the second BFER is 0, and the last four bits of the corresponding bit string are 0100. A summation operation is performed on the bit strings of the first BFER and the second BFER to obtain a bit string corresponding to both the first BFER and the second BFER, and the last four bits of the bit string are 0110.

Step 1102: The BFIR obtains a second OAM request packet according to the bit string.

The second OAM request packet may be considered as an OAM request packet whose entire content is not completely generated. A packet header of the second OAM request packet includes the bit string that is obtained in the last step and that is corresponding to the at least one BFER and an ID of the BFIR, and a payload of the second OAM request packet includes an OAM packet.

To identify a source of the OAM request packet, the BFIR needs to obtain the ID of the BFIR, and add the ID into the packet header of the second OAM request packet. In addition, the BFIR further needs to add the bit string corresponding to the at least one BFER into the packet header of the second OAM request packet, so as to identify a destination BFER of the second OAM request packet.

To enable the BFR in the BIER network to identify a received packet as an OAM request packet, the BFIR further needs to set a first bit of the packet header of the second OAM request packet, that is, set the first bit to 1 from 0, and identify a packet type as a request type in a second bit of the second OAM request packet.

Optionally, the BFIR may further generate a type length value TLV carrying the set identifier and the bit string that are corresponding to the at least one BFER, and add the TLV into the second OAM request packet.

Step 1103: The BFIR obtains a first OAM request packet by inserting a first BIER-MPLS Label into the second OAM request packet according to the set identifier.

The first BIER-MPLS Label includes a label corresponding to the set identifier.

A BIER-MPLS Label (not shown in FIG. 12) is a label inserted into an OAM packet when MPLS encapsulation is performed on the OAM packet, the label is corresponding to the set identifier of the at least one BFER, and a correspondence between the BIER-MPLS Label and the set identifier of the BFER may be shown in Table 4.

TABLE 4

| BIER-MPLS Label | Set identifier of a BFER |
| --- | --- |
| Label 101 | 1 |
| Label 102 | 2 |
| Label 103 | 3 |

The BFIR determines a corresponding BIER-MPLS Label according to the set identifier of the at least one BFER, and obtains the first OAM request packet by inserting the BIER-MPLS Label into the second OAM request packet.

It should be noted that when the BFIR needs to test links to two or more BFERs, if set identifiers corresponding to the two or more BFERs are the same, that is, a situation shown in this embodiment, corresponding BIER-MPLS Labels are also the same, and the BFIR needs to generate only one first OAM request packet. However, if set identifiers that are respectively corresponding to the two or more BFERs are different, corresponding BIER-MPLS Labels are also different, and the BFIR needs to perform classification according to a same set identifier and generate an OAM request packet for BFERs with a same set identifier. If the BFERs fall into n types, n OAM request packets are generated, and each OAM request packet is used for testing one type of BFER.

Step 1104: The BFIR determines a first TTL, where a value of the first TTL is M, and M is used to identify a hop count before the first OAM request packet arrives at a first BFR from the BFIR.

The hop-by-hop testing requires testing on each hop. Therefore, as a step different from the embodiment in FIG. 10A to FIG. 10C, the BFIR needs to set different TTLs for the first OAM request packet, so as to complete the hop-by-hop testing. For example, when testing of the $n^{th}$ hop is performed, the TTL is set to n.

As shown in FIG. 1, when the BFIR tests a link between the BFIR and the first BFER on a hop-by-hop basis, a hop count before the first OAM request packet arrives at an intermediate BFR1 from the BFIR is 1, and the BFIR determines that the value of the first TTL is 1.

Obviously, if four hops are required between the BFIR and the first BFER, the BFIR sets the TTL of the first OAM request packet to 1 when performing testing of the first hop, sets the TTL of the first OAM request packet to 2 when performing testing of the second hop, sets the TTL of the first OAM request packet to 3 when performing testing of the third hop, and sets the TTL of the first OAM request packet to 4 when performing testing of the fourth hop, and so on. Details are not described in this specification.

Step 1105: The BFIR adds the first TTL into the first OAM request packet.

In this embodiment, the BFIR sets a TTL of a BIER-MPLS Label of the first OAM request packet to 1.

Step 1106: The BFIR sends the first OAM request packet to an intermediate BFR1.

Step 1107: The intermediate BFR1 receives the first OAM request packet from the BFIR.

Step 1108: The intermediate BFR1 determines, according to the first OAM request packet, that a destination BFR corresponding to the first OAM request packet is the intermediate BFR1.

The intermediate BFR1 determines a corresponding set identifier according to the BIER-MPLS Label in the first OAM request packet, and the intermediate BFR1 further obtains a bit string from a packet header of the first OAM request packet.

The intermediate BFR1 obtains, by means of calculation, an ID of at least one destination BFER according to the set identifier and the bit string, and checks whether an ID of the intermediate BFR1 is the ID of the at least one destination BFER.

Because a destination BFER of the first OAM request packet is the first BFER and the second BFER, the intermediate BFR1 checks that the ID of the intermediate BFR1 is not the destination BFER of the first OAM request packet, and continues to execute the following steps.

1. The intermediate BFR1 decreases the value of the first TTL by a preset value.

In this embodiment, the preset value is 1. The TTL of the BIER-MPLS Label needs to be decreased by 1 each time the first OAM request packet arrives at one BFR, and because the first TTL of the BIER-MPLS Label of the first OAM request packet is 1, the first TTL becomes 0 after the intermediate BFR1 decreases the value of the first TTL by 1.

2. When determining that the value of the first TTL obtained after the preset value is deducted reaches 0, the intermediate BFR1 determines that the destination BFR corresponding to the first OAM request packet is the intermediate BFR1.

Because the value of the first TTL obtained after the preset value is deducted reaches 0, the intermediate BFR1 determines that the destination BFR corresponding to the first OAM request packet is the intermediate BFR1, that is, the intermediate BFR1 needs to respond to packet content of the first OAM request packet, and send a first OAM response packet to the BFIR.

That is, the destination BFR corresponding to the first OAM request packet is a BFR that receives the first OAM request packet and that does not continue to forward the first OAM request packet, for example, the intermediate BFR1 in this embodiment.

Step 1109: The intermediate BFR1 sends a first OAM response packet to the BFIR according to the first OAM request packet.

The intermediate BFR1 obtains the first OAM response packet according to the first OAM request packet.

The intermediate BFR1 sends the first OAM response packet to the BFIR after obtaining the first OAM response packet according to the first OAM request packet.

Step 1110: The BFIR receives the first OAM response packet from the intermediate BFR1.

When the BFIR receives the first OAM response packet from the intermediate BFR1, it is determined that the BFIR is connected to the intermediate BFR1.

In addition, the BFIR processes the first OAM response packet sent by the intermediate BFR1, and a processing process is similar to that of step 1017.

It should be noted that after sending the first OAM request packet, the BFIR sets a timer, and when not receiving the first OAM response packet from the intermediate BFR1 within preset duration, may determine that the BFIR is not connected to the intermediate BFR1.

Step 1111: The BFIR obtains a second TTL according to the first OAM response packet and the first TTL, where a value of the second TTL is a result of adding a preset value to the value of the first TTL.

In this case, the BFIR determines that the BFIR is connected to the intermediate BFR1. Further, the BFIR obtains the second TTL by adding the preset value to the value of the first TTL, and the second TTL is set to 2 in this embodiment. That is, the BFIR tests a next hop of the intermediate BFR1. That is, the second TTL is used to identify a next-hop BFR that is on the link between the BFIR and the first BFER and that is of the intermediate BFR1.

Step 1112: The BFIR obtains a third OAM request packet by inserting a second BIER-MPLS Label into the second OAM request packet according to the second TTL and the set identifier.

The second BIER-MPLS Label includes a label and the second TTL, and the label is corresponding to the set identifier corresponding to the at least one BFER. The third OAM request packet is used for testing a link between the BFIR and a second BFR, and the second BFR is a next-hop BFR that is on the link between the BFIR and the first BFER and that is of the intermediate BFR1.

It should be noted that the BFIR needs to set only the TTL of the BIER-MPLS Label of the second OAM request packet, and payload content of the second OAM request packet remains unchanged, so as to generate the third OAM request packet. The first OAM request packet differs from the third OAM request packet only in a label and a TTL of a BIER-MPLS Label.

A BFIR side instead of the BFIR knows which BFR is a next hop of the intermediate BFR1, the second BFR as the next hop of the intermediate BFR1 is on the link between the BFIR and the first BFER, and the second BFR and the intermediate BFR1 are on a same link. Therefore, the BFIR may send the third OAM request packet to the first BFER, so as to send an OAM request packet to the second BFR.

Step 1113: The BFIR sends the third OAM request packet to the intermediate BFR1.

Step 1114: The intermediate BFR1 receives the third OAM request packet from the BFIR.

The intermediate BFR1 determines a corresponding set identifier according to the BIER-MPLS Label in the third OAM request packet, and the intermediate BFR1 further obtains a bit string from a packet header of the third OAM request packet.

The intermediate BFR1 obtains, by means of calculation, an ID of at least one destination BFER according to the set identifier and the bit string, and checks whether an ID of the intermediate BFR1 is the ID of the at least one destination BFER.

Because a destination BFER of the third OAM request packet is the first BFER and the second BFER, the intermediate BFR1 checks that the ID of the intermediate BFR1 is not the destination BFER of the third OAM request packet, and continues to execute the following steps.

1. The intermediate BFR1 decreases the value of the second TTL by a preset value.

In this embodiment, the preset value is 1. The TTL of the BIER-MPLS Label needs to be decreased by 1 each time the third OAM request packet arrives at one BFR, and because the second TTL of the BIER-MPLS Label of the third OAM request packet is 2, the second TTL becomes 1 after the intermediate BFR1 decreases the value of the second TTL by 1.

2. When determining that the value of the second TTL obtained after the preset value is deducted does not reach 0, the intermediate BFR1 determines that the destination BFR corresponding to the third OAM request packet is not the intermediate BFR1.

Because the value of the second TTL obtained after the preset value is deducted does not reach 0, the intermediate BFR1 determines that the destination BFR corresponding to the third OAM request packet is not the intermediate BFR1.

In this case, after performing label switching on the BIER-MPLS Label in the third OAM request packet, the intermediate BFR1 forwards the third OAM request packet to a next-hop BFR, that is, the first BFER.

Step 1115: The intermediate BFR1 sends the third OAM request packet to a first BFER.

Step 1116: The first BFER receives the third OAM request packet from the intermediate BFR1.

Step 1117: The first BFER determines, according to the third OAM request packet, that a destination BFR corresponding to the third OAM request packet is the first BFER.

The first BFER determines, according to the set identifier and the bit string that are included in the third OAM request packet, that the at least one BFER includes the first BFER.

The first BFER obtains the bit string of the third OAM request packet and the set identifier corresponding to the BIER-MPLS Label, and obtains, by means of calculation, the ID of the at least one destination BFER according to the set identifier and the bit string. The first BFER checks whether the ID of the first BFER is included in the ID of the at least one BFER; and if the ID of the first BFER is included in the ID of the at least one BFER, the first BFER determines that the at least one destination BFER corresponding to the third OAM request packet includes the first BFER. That is, the first BFER needs to respond to the third OAM request packet.

Step 1118: The first BFER sends a third OAM response packet to the intermediate BFR1.

The first BFER obtains the third OAM response packet, and the obtaining process is similar to the process shown in step 1010 to step 1013. Details are not described in this specification again.

Then, the first BFER sends the third OAM response packet to the intermediate BFR1.

Step 1119: The intermediate BFR1 receives a third OAM response packet from the first BFER.

A TTL of a BIER-MPLS Label of the third OAM response packet is set to a maximum value, and the intermediate BFR1 is not a destination BFIR of the third OAM response packet. Therefore, the intermediate BFR1 does not need to reply to the third response packet, and directly forwards the third response packet to a next hop, that is, the BFIR.

Step 1120: The intermediate BFR1 sends the third OAM response packet to the BFIR.

Step 1121: The BFIR receives the third OAM response packet from the first BFER.

The BFIR processes the third OAM response packet, and a processing process is similar to that of step 1017.

When the BFIR receives the third OAM response packet from the first BFER, it is determined that the BFIR is connected to the first BFER.

Certainly, if the BFIR receives only the first OAM response packet from the intermediate BFR1, but does not receive the third OAM response packet from the first BFER within preset duration, it is determined that a link between the intermediate BFR1 and a next-hop BFR of the intermediate BFR1 is faulty.

In conclusion, according to this embodiment, an OAM request packet from a BFIR is received; it is determined, according to the OAM request packet, that a destination BFR corresponding to the OAM request packet is a first BFR; an OAM response packet is obtained according to an ID of the BFIR; and the OAM response packet is sent to the BFIR. This resolves a problem that the BFIR cannot diagnose or handle a transmission fault when the fault occurs during transmission of a multicast packet, so that connectivity testing can be implemented by using an OAM packet and multiple BFERs can be diagnosed at the same time.

In this embodiment, a TTL of a BIER-MPLS Label of the OAM request packet is further set to different values, so that the BFIR can test each BFR on a forwarding path, and a forwarding fault can be quickly located.

In this embodiment, after receiving the OAM request packet, a BFR further generates an OAM reply packet according to the OAM request packet, and adds information such as a timestamp, a reply code, and a serial number into the OAM reply packet, so that when receiving the OAM reply packet, the BFIR can analyze information in the OAM reply packet, thereby increasing usage scenarios of the OAM packet.

In this embodiment, a multi-hop testing mechanism of the OAM packet is further implemented by setting the TTL in the OAM request packet. In this way, a path of each hop between a BFIR and a BFER can be tested, and a fault can be accurately located.

It should be additionally noted that, in step 1109, that the intermediate BFR1 obtains the first OAM response packet according to the first OAM request packet may include the following steps.

First, the intermediate BFR1 obtains, according to the ID of the BFIR, the set identifier and the bit string that are corresponding to the BFIR.

The intermediate BFR1 obtains the ID of the BFIR from the packet header of the first OAM request packet, and obtains, according to the ID, the set identifier and the bit string that are corresponding to the BFIR.

Second, the intermediate BFR1 obtains the second OAM response packet according to the bit string corresponding to the BFIR.

The second OAM response packet may be considered as an OAM response packet whose entire content is not completely generated. A packet header of the second OAM response packet includes the bit string corresponding to the BFIR and the ID of the intermediate BFR1, and a payload of the second OAM response packet includes an OAM packet.

The intermediate BFR1 adds the bit string corresponding to the BFIR into the packet header of the second OAM response packet, so as to identify a destination BFR of the second OAM response packet as a BFIR.

To identify a source of the second OAM response packet, the intermediate BFR1 needs to obtain the ID of the intermediate BFR1, and add the ID into the packet header of the second OAM response packet. In addition, the intermediate BFR1 further needs to add the bit string corresponding to the intermediate BFR1 into the packet header of the second OAM response packet, so as to identify the source of the second OAM response packet as the intermediate BFR1.

The intermediate BFR1 further needs to set a first bit of the packet header of the second OAM response packet, that is, set the first bit to 1 from 0, and identify a packet type as a request type in a second bit of the second OAM request packet.

Optionally, the intermediate BFR1 further obtains the ID of the BFIR, and the BFIR is a previous-hop BFR that is on the link between the BFIR and the first BFER and that is of the intermediate BFR1.

The intermediate BFR1 adds the ID of the BFIR into a previous-hop bit-forwarding router field in the payload of the second OAM response packet.

It should be noted that this embodiment imposes no limitation on a manner for obtaining the ID of the BFIR by the intermediate BFR1. As a possible implementation manner, before sending the first OAM request packet to the intermediate BFR1, the BFIR may add the ID of the BFIR into the first OAM request packet. Correspondingly, the intermediate BFR1 may obtain the ID of the BFIR from the first OAM request packet. As another possible implementation manner, the first OAM request packet is sent by the BFIR to the intermediate BFR1, and a label in the first OAM request packet is a label agreed upon between the BFIR and the intermediate BFR1. Therefore, the intermediate BFR1 may also learn the ID of the BFIR by using the label.

Optionally, the intermediate BFR1 may further check, according to the TLV in the OAM request packet, whether the intermediate BFR1 is the destination BFER of the OAM request packet, which may include the following steps.

1. The intermediate BFR1 determines the at least one BFER according to the TLV included in the OAM request packet.

The intermediate BFR1 obtains the ID of the at least one BFER according to the set identifier, the bit string, and the length of the bit string that are carried in the TLV; the intermediate BFR1 checks whether the ID of the intermediate BFR1 is included in the ID of the at least one BFER; and if the ID of the intermediate BFR1 is not included in the ID of the at least one BFER, the intermediate BFR1 determines that the at least one destination BFER corresponding to the OAM request packet does not include the intermediate BFR1.

2. The intermediate BFR1 verifies that the destination BFR of the OAM request packet is not the intermediate BFR1.

In this case, the intermediate BFR1 may further generate a corresponding reply code according to a verification result.

For example, a reply code 1 indicates that the intermediate BFR1 is the destination BFR of the OAM request packet, a reply code 0 indicates that the intermediate BFR1 is not the destination BFR of the OAM request packet, and the intermediate BFR1 generates the reply code 0, and adds the reply code 0 into a reply code field in a payload of a second OAM reply packet.

Third, the intermediate BFR1 obtains a first OAM response packet by inserting a BIER-MPLS Label into the second OAM response packet according to the set identifier corresponding to the BFIR.

The BIER-MPLS Label includes a label corresponding to the set identifier corresponding to the BFIR.

The intermediate BFR1 determines a corresponding BIER-MPLS Label according to the set identifier corresponding to the BFIR, and obtains, by inserting the BIER-MPLS Label into the second OAM response packet, the first OAM response packet on which the MPLS encapsulation is performed.

Fourth, the intermediate BFR1 adds a TTL of the BIER-MPLS Label into the first OAM response packet.

To avoid that the first OAM response packet cannot be forwarded to the BFIR because the TTL is already decreased to 0 when the first OAM response packet arrives at a BFR between the BFER and the BFIR, the intermediate BFR1 sets the TTL to a maximum value. Generally, the TTL is set to 255.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

The invention claimed is:

1. A bit-forwarding ingress router (BFIR) comprises:
a network interface, a memory storing instructions; and
a processor coupled to the memory to execute the instructions to:
generate a first operation, administration and maintenance (OAM) request packet, wherein the first OAM request packet comprises an identifier (ID) of the BFIR, a first set identifier, and a first bit string corresponding to at least one bit-forwarding egress router (BFER), wherein the OAM request packet further comprises a type length value (TLV), and the TLV is used to carry the first set identifier, the first bit string, and a length of the first bit string; and
send the first OAM request packet to the at least one BFER by using the network interface.

2. The BFIR according to claim 1, wherein the processor executes the instructions to:
determine the first set identifier and the first bit string according to an ID of the at least one BFER, wherein the first bit string is corresponding to the ID of the at least one BFER, and the first set identifier is corresponding to the ID of the at least one BFER.

3. The BFIR according to claim 1, wherein the processor executes the instructions to:

encapsulate the first OAM request packet with a first bit indexed explicit replication multiprotocol label switching label (BIER-MPLS Label); and send the first OAM request packet with the BIER-MPLS label to the at least one BFER by using the network interface.

4. The BFIR according to claim 1, the first OAM request packet is used for connectivity testing on a link between the BFIR and a first bit-forwarding router (BFR), and the first BFR is a device on the link between the BFIR and the at least one BFER; and the processor further executes the instructions to:

determine a first time-to-live (TTL), wherein a value of the first TTL is set successively starting from 1, and the TTL is used to identify a hop count before the first OAM request packet arrives at the first BFR from the BFIR; and add the first TTL into the first OAM request packet.

5. The BFIR according to claim 1, wherein the at least one BFER comprises a first BFER; and the processor further executes the instructions to:

receive an OAM response packet from the first BFER, wherein the OAM response packet comprises an ID of the first BFER, a second set identifier, and a second bit string.

6. A first bit-forwarding router (BFR) comprises:

a network interface, a memory storing instructions; and a processor coupled to the memory to execute the instructions to:

receive an operation, administration and maintenance (OAM) request packet from a bit-forwarding ingress router (BFIR) by using the network interface, wherein the OAM request packet comprises an identifier (ID) of the BFIR, a first set identifier, and a first bit string;

generate a first OAM response packet, wherein the first OAM response packet comprises an ID of the first BFR and a second set identifier and a second bit string; and send the first OAM response packet to the BFIR by using the network interface.

7. The first BFR according to claim 6, the processor executes the instructions to:

determine, according to the first set identifier and the first bit string that are comprised in the OAM request packet, that the at least one BFER comprises an first BFR; and determine that the destination BFR corresponding to the OAM request packet is the first BFR.

8. The first BFR according to claim 6, wherein the OAM request packet further comprises a type length value (TLV), and the TLV is used to carry the first set identifier, the first bit string, and a length of the bit string.

9. The first BFR according to claim 6, wherein the first BFR is a BFR on the link between the BFIR and the at least one BFER, and a packet header of the OAM request packet comprises a time-to-live (TTL);

the processor further executes the instructions to:

determine that the value of the TTL obtained after the preset value is deducted reaches 0, and determine that a destination BFR corresponding to the OAM request packet is the first BFR.

10. The first BFR according to claim 6, wherein the first BFR is a BFR on the link between the BFIR and the at least one BFER, and a packet header of the OAM request packet comprises a TTL, the processor further executes the instructions to:

determine that the value of the TTL obtained after the preset value is deducted does not reach 0; and forward the OAM request packet to the at least one BFER.

11. An operation, administration and maintenance (OAM) test method, comprising:

generating, by a bit-forwarding ingress router (BFIR), a first operation, administration and maintenance (OAM) request packet, wherein the first OAM request packet comprises an identifier (ID) of the BFIR, a first set identifier, and a first bit string corresponding to at least one bit-forwarding egress router (BFER), wherein the OAM request packet further comprises a type length value (TLV), and the TLV is used to carry the first set identifier, the first bit string, and a length of the first bit string; and sending, by the BFIR, the first OAM request packet to the at least one BFER.

12. The method according to claim 11, the method further comprises:

determining, by the BFIR, the first set identifier and the first bit string according to the ID of the at least one BFER, wherein the first bit string is corresponding to the ID of the at least one BFER, and the first set identifier is corresponding to the ID of the at least one BFER.

13. The method according to claim 11, wherein sending, by the BFIR, the first OAM request packet to the at least one BFER further comprises:

encapsulating, by the BFIR, the first OAM request packet with a first bit indexed explicit replication multiprotocol label switching label (BIER-MPLS Label); and sending, by the BFIR, the first OAM request packet with the BIER-MPLS label to the at least one BFER by using the network interface.

14. The method according to claim 11, wherein the first OAM request packet is used for connectivity testing on a link between the BFIR and a first bit-forwarding router (BFR), and the first BFR is a device on the link between the BFIR and the at least one BFER; and the method further comprises: determining, by the BFIR, a first time-to-live (TTL), wherein a value of the first TTL is set successively starting from 1, and the TTL is used to identify a hop count before the first OAM request packet arrives at the first BFR from the BFIR; and adding, by the BFIR, the first TTL into the first OAM request packet.

15. The method according to claim 11, wherein the at least one BFER comprises a first BFER, and the method further comprises:

receiving, by the BFIR, an OAM response packet from the first BFER, wherein the OAM response packet from the first BFER, wherein the OAM response packet comprises an ID of the first BFER, a second set identifier, and a second bit string.

16. An operation, administration and maintenance (OAM) test method, comprising:

receiving, by a first bit-forwarding router (BFR), an operation, administration and maintenance (OAM) request packet from a bit-forwarding ingress router (BFIR) by using the network interface, wherein the OAM request packet comprises an identifier (ID) of the BFIR, a first set identifier and a first bit string;

generating, by the first BFR, a first OAM response packet, wherein the first OAM response packet comprises an ID of the first BFR and a second set identifier and a second bit string; and sending, by the first BFR, the first OAM response packet to the BFIR.

17. The method according to claim 16, wherein the first BFR is a BFER among the at least one BFER, the method further comprises:
 determining, by the first BFR according to the first set identifier and the first bit string that are comprised in the OAM request packet, that the at least one BFER comprises an first BFR; and
 determining, by the first BFR, that a destination BFR corresponding to the OAM request packet is the first BFR.

18. The method according to claim 16, wherein the OAM request packet further comprises a type length value (TLV), and the TLV is used to carry the first set identifier, the first bit string, and a length of the first bit string.

19. The method according to claim 16, wherein the first BFR is a BFR on the link between the BFIR and the at least one BFER, and a packet header of the OAM request packet comprises a time-to-live (TTL), wherein the method further comprises:
 determining, by the first BFR, the value of the TTL obtained after the preset value is deducted reaches 0; and
 determine, by the first BFR, a destination BFR corresponding to the OAM request packet is the first BFR.

20. The method according to claim 15, wherein the first BFR is a BFR on the link between the BFIR and the at least one BFER, and a packet header of the OAM request packet comprises a time-to-live (TTL), wherein the method further comprises:
 determining, by the first BFR, that the value of the TTL obtained after the preset value is deducted does not reach 0; and
 sending, by the first BFR, the OAM request packet to the at least one BFER.

21. An operation, administration and maintenance (OAM) test system, comprising:
 A bit-forwarding ingress router (BFIR) and a first bit-forwarding router (BFR);
 wherein the BFIR is configured to:
 generate a first operation, administration and maintenance (OAM) request packet, wherein the first OAM request packet comprises an identifier (ID) of the BFIR, a first set identifier, and a first bit string corresponding to at least one bit-forwarding egress router (BFER); and
 send the first OAM request packet to the first BFR among the at least one BFER; and
 wherein the BFR is configured to:
 receive the OAM request packet from the BFIR;
 in response to receive the OAM request packet, generate a first OAM response packet, wherein the first OAM response packet comprises an ID of the first BFR and the second set identifier and the second bit string; and
 send the first OAM response packet to the BFIR by using a network interface of the first BFR.

* * * * *